(12) United States Patent
Kaifuku et al.

(10) Patent No.: US 8,744,657 B2
(45) Date of Patent: Jun. 3, 2014

(54) HYBRID DRIVE SYSTEM

(75) Inventors: Masakazu Kaifuku, Okazaki (JP); Tooru Matsubara, Toyota (JP)

(73) Assignees: Aisin AW Co., Ltd., Anjo (JP); Toyota Jidosha Kabushiki Kaisha, Toyota (JP)

( * ) Notice: Subject to any disclaimer, the term of this patent is extended or adjusted under 35 U.S.C. 154(b) by 25 days.

(21) Appl. No.: 13/583,165

(22) PCT Filed: Jun. 15, 2011

(86) PCT No.: PCT/JP2011/063651
§ 371 (c)(1),
(2), (4) Date: Sep. 6, 2012

(87) PCT Pub. No.: WO2011/158853
PCT Pub. Date: Dec. 22, 2011

(65) Prior Publication Data
US 2013/0079961 A1 Mar. 28, 2013

(30) Foreign Application Priority Data
Jun. 15, 2010 (JP) .................................. 2010-136395

(51) Int. Cl.
*B60L 11/00* (2006.01)
*B60L 9/00* (2006.01)
*G05D 1/00* (2006.01)
*G06F 17/00* (2006.01)
*G05D 3/00* (2006.01)

(52) U.S. Cl.
USPC ......................... 701/22; 180/65.23; 903/903

(58) Field of Classification Search
USPC ............ 701/22, 67, 113, 54, 110, 51, 60, 21, 701/59; 180/65.23, 65.26, 65.28, 65.21, 65; 477/7, 107, 3, 5; 307/104
See application file for complete search history.

(56) References Cited

U.S. PATENT DOCUMENTS 7,575,078 B2 * 8/2009 Muta et al. ............... 180/65.265
7,909,728 B2 * 3/2011 Tabata et al. ...................... 477/3
(Continued)

FOREIGN PATENT DOCUMENTS

JP     A-2005-30281     2/2005
JP     A-2006-298078    11/2006
(Continued)

OTHER PUBLICATIONS

International Search Report issued in International Patent Application No. PCT/JP2011/063651 dated Sep. 13, 2011.

*Primary Examiner* — Thomas Black
*Assistant Examiner* — Robert Payne
(74) *Attorney, Agent, or Firm* — Oliff PLC

(57) ABSTRACT

A hybrid drive system including a rotating electric machine; an input member drive-coupled to an internal combustion engine and the rotating electric machine; an output member drive-coupled to a wheel; a speed change device with a plurality of switchable shift speeds changes the rotational speed of the input member and transmits the changed rotational speed to the output member; and a control device that controls the rotating electric machine. The control device corrects the output torque of the rotating electric machine so as to cancel out a torque fluctuation of the input member that accompanies an initial explosion of the internal combustion engine; and, when the initial explosion of the internal combustion engine occurs during a shift operation of the speed change device, modifies the torque correction amount in a direction that suppresses a change in the rotational speed of the input member that advances the shift operation.

20 Claims, 10 Drawing Sheets

(56) References Cited

U.S. PATENT DOCUMENTS

| | | | |
|---|---|---|---|
| 7,922,618 B2* | 4/2011 | Matsubara et al. | 477/3 |
| 7,955,215 B2* | 6/2011 | Shibata | 477/3 |
| 7,998,021 B2* | 8/2011 | Matsubara et al. | 477/3 |
| 8,010,263 B2* | 8/2011 | Morris | 701/51 |
| 8,109,856 B2* | 2/2012 | Kaltenbach | 477/5 |
| 8,255,132 B2* | 8/2012 | Tabata et al. | 701/59 |
| 8,386,140 B2* | 2/2013 | Tsuda et al. | 701/60 |
| 8,511,408 B2* | 8/2013 | Iwase et al. | 180/65.285 |
| 8,579,760 B2* | 11/2013 | Imamura et al. | 477/7 |
| 8,591,378 B2* | 11/2013 | Matsubara et al. | 477/3 |
| 2008/0132379 A1* | 6/2008 | Matsubara et al. | 477/3 |
| 2009/0055073 A1* | 2/2009 | Matsubara et al. | 701/102 |
| 2010/0093491 A1* | 4/2010 | Robert | 477/167 |
| 2010/0125021 A1* | 5/2010 | Matsubara et al. | 477/5 |
| 2013/0030624 A1* | 1/2013 | Suyama et al. | 701/22 |
| 2013/0066494 A1* | 3/2013 | Kamijo | 701/22 |
| 2013/0096811 A1* | 4/2013 | Yamauchi et al. | 701/112 |
| 2013/0179055 A1* | 7/2013 | Kato et al. | 701/113 |
| 2013/0218432 A1* | 8/2013 | Kudo et al. | 701/67 |
| 2013/0274980 A1* | 10/2013 | Takamura et al. | 701/22 |
| 2013/0307449 A1* | 11/2013 | Kobayashi et al. | 318/400.02 |
| 2014/0020664 A1* | 1/2014 | Yoshioka et al. | 123/559.1 |

FOREIGN PATENT DOCUMENTS

| | | |
|---|---|---|
| JP | A-2007-131153 | 5/2007 |
| JP | A-2008-137619 | 6/2008 |
| JP | A-2009-47107 | 3/2009 |
| JP | A-2009-73268 | 4/2009 |
| JP | A-2009-234292 | 10/2009 |
| JP | A-2010-70008 | 4/2010 |
| JP | A-2010-120517 | 6/2010 |

* cited by examiner

HYBRID DRIVE SYSTEM

INCORPORATION BY REFERENCE

The disclosure of Japanese Patent Application No. 2010-136395 filed on Jun. 15, 2010 including the specification, drawings and abstract is incorporated herein by reference in its entirety.

BACKGROUND OF THE INVENTION

The present invention relates to a hybrid drive system that includes a rotating electric machine; an input member that is drive-coupled to an internal combustion engine and the rotating electric machine; an output member that is drive-coupled to a wheel; a speed change device that has a plurality of switchable shift speeds, and changes the rotational speed of the input member at respective speed ratios of the shift speeds and transmits the changed rotational speed to the output member; and a control device that at least performs an operation control for the rotating electric machine.

DESCRIPTION OF THE RELATED ART

A device described in Japanese Patent Application Publication No. JPA-2005-030281 below, for example, is already known as a hybrid drive system similar to that described above. The hybrid drive system can run a vehicle by switching at least between a motor operation mode that runs the vehicle using the torque of the rotating electric machine, and a torque conversion operation mode that runs the vehicle while utilizing the torque of the internal combustion engine. When switching from the motor operation mode to the torque conversion operation mode, the stopped internal combustion engine is started up using an internal combustion engine start-up control.

However, during initial explosion the internal combustion engine ignites under a condition of excess air compared to steady operation, and therefore the internal combustion engine outputs a large torque and sharply increases in speed. That is, when starting up, the internal combustion engine generates a large initial explosion torque. Due to the influence of the initial explosion torque, torque fluctuations are transmitted through the input member and the speed change device to the output member, and such torque fluctuations may produce a shock felt by the driver of the vehicle. Therefore, in a hybrid drive system described in JP-A-2005-030281 below, a control device corrects the output torque of the rotating electric machine so as to cancel out the torque fluctuations in the output member resulting from the initial explosion of the internal combustion engine. Thus, the shock that accompanies the initial explosion of the internal combustion engine can be reduced.

However, the magnitude of the initial explosion of the internal combustion engine does not remain constant, and there is a certain range of variation each time the internal combustion engine starts up. This variation in the initial explosion torque poses almost no problem during normal operation, but problems such as the following arise when the initial explosion of the internal combustion engine overlaps with a shift operation of the speed change device. Namely, when the magnitude of the initial explosion torque is larger or smaller than expected, the shift operation rapidly advances based on a relationship with the direction of changes in the rotational speed of the input member during the shift operation, and a shift shock may thus occur during the shift operation.

As a countermeasure against the problem described above, Japanese Patent Application Publication No. JP-A-2009-047107 describes a control that is executed in accordance with a predetermined sequence, instead of simultaneously executing the internal combustion engine start-up control and a shift control when an internal combustion engine start-up request and a shift request are made at almost the same time. Namely, in such case, the control device as a general rule gives priority to executing the shift control and subsequently executes the internal combustion engine start-up control. However, if the vehicle required drive power changes, the control device gives priority to executing the internal combustion engine start-up control. In the internal combustion engine start-up control, starting up of the internal combustion engine is completed earlier than normal, after which the control device executes the shift control. By performing such controls, the occurrence of shift shock can be suppressed while also appropriately handling changes in the required drive power.

However, the hybrid drive system described in JP-A-2009-047107 executes the internal combustion engine start-up control and the shift control in an order that follows a predetermined sequence in each case. Therefore, a satisfactory response before completion of both the internal combustion engine start-up control and the shift control is not always achieved.

SUMMARY OF THE INVENTION

Hence, a hybrid drive system is desired that, when an internal combustion engine start-up request and a shift request are almost simultaneously made, can suppress the occurrence of shock and achieves a satisfactory response before completion of both an internal combustion engine start-up control and a shift control.

A hybrid drive system according to a first aspect of the present invention includes a rotating electric machine; an input member that is drive-coupled to an internal combustion engine and the rotating electric machine; an output member that is drive-coupled to a wheel; a speed change device that has a plurality of switchable shift speeds, and changes the rotational speed of the input member at a speed ratio of the respective shift speeds and transmits the changed rotational speed to the output member; and a control device that at least performs an operation control for the rotating electric machine. In this hybrid drive system, the control device includes a first torque correction section that corrects the output torque of the rotating electric machine so as to cancel out a torque fluctuation of the input member that accompanies an initial explosion of the internal combustion engine; and a second torque correction section that, when the initial explosion of the internal combustion engine occurs during a shift operation of the speed change device, modifies the torque correction amount set by the first torque correction section in a direction that suppresses a change in the rotational speed of the input member that advances the shift operation.

Note that "during a shift operation" refers to a period during which the rotational speed of the input member changes as the shift operation of the speed change device advances. More specifically, "during a shift operation" refers to a period during which the actual rotational speed of the input member is greater than a pre-shift estimated rotational speed of the input member and less than a post-shift estimated rotational speed, which are calculated based on the rotational speed of the output member.

In addition, the "speed ratio" refers to a percentage by which the rotational speed of the input member is converted in speed when the speed change device transmits the rotation of the input member to the output member. Therefore, the speed ratio equals a value obtained by dividing the rotational speed of the input member at a particular shift speed by the rotational speed of the output member.

Moreover, "drive-coupled" refers to a state in which two rotation elements are connected capable of transmitting drive power, and is used as an idea that includes a state in which the two rotation elements are coupled so as to rotate together, or a state in which the two rotation elements are coupled capable of transmitting drive power through one, two, or more transmission members. Such transmission members include various types of members that transmit rotation at the same speed or a changed speed, and include a shaft, a gear mechanism, a belt, and a chain, for example.

The "rotating electric machine" is also used as an idea that includes any one of a motor (electric motor), a generator (electric generator), and a motor/generator that carries out both the functions of a motor and a generator as necessary.

According to the first aspect of the present invention, the first torque correction section corrects the output torque of the rotating electric machine, whereby torque fluctuations of the input member that accompany the initial explosion of the internal combustion engine can be suppressed, and torque fluctuations transmitted through the speed change device to the output member can also be suppressed. Thus, the shock that accompanies the initial explosion of the internal combustion engine can be reduced.

To correct the output torque of the rotating electric machine during the initial explosion of the internal combustion engine as described above, when the initial explosion of the internal combustion engine occurs during the shift operation, the second torque correction section modifies the torque correction amount, using the torque correction amount set by the first torque correction section as a reference. The modification made by the second torque correction section to the torque correction amount acts to suppress changes in the rotational speed of the input member that advance the shift operation. Therefore, even if variations in an initial explosion torque cause the magnitude of the initial explosion torque to be a magnitude that advances the shift operation more than the expected magnitude, it is possible to suppress rapid advancing of the shift operation that leads to the occurrence of shift shock during the shift operation. Thus, according to the first aspect of the present invention, even if an internal combustion engine start-up control and a shift control are simultaneously executed in parallel, both the shock that accompanies the initial explosion of the internal combustion engine and the shift shock during the shift operation can be effectively suppressed. Since the internal combustion engine start-up control and the shift control are simultaneously executed in parallel in this manner, an excellent response before completion of both the internal combustion engine start-up control and the shift control is achieved.

Note that, even if the magnitude of the initial explosion torque is a magnitude that slows the shift operation more than the expected magnitude, it is naturally possible to suppress the occurrence of shock. In this case, the shift operation itself somewhat slows, and the response before completion of both the internal combustion engine start-up control and the shift control can at least be improved over the response when the internal combustion engine start-up control and the shift control are sequentially executed.

Thus, according to the first aspect of the present invention, it is possible to provide a hybrid drive system that can suppress the occurrence of shock and achieves a satisfactory response before completion of both the internal combustion engine start-up control and the shift control if an internal combustion engine start-up request and a shift request are almost simultaneously made.

According to a second aspect of the present invention, the second torque correction section may modify the torque correction amount in a direction that corresponds to a switching direction of the shift speed of the speed change device.

During the shift operation, the direction of changes in the rotational speed of the input member that advance the shift operation differs depending on the direction in which the shift speed of the speed change device is switched.

According to the second aspect of the present invention, depending on the direction in which the shift speed of the speed change device is switched, the torque correction amount can be appropriately modified in a direction that suppresses changes in the rotational speed of the input member that advance the shift operation.

According to a third aspect of the present invention, the second torque correction section, if the shift speed of the speed change device is switched to a shift speed with a larger speed ratio, may modify the torque correction amount so as to change the output torque of the rotating electric machine toward a negative direction with respect to the output torque corrected by the first torque correction section. Also, the second torque correction section, if the shift speed of the speed change device is switched to a shift speed with a smaller speed ratio, may modify the torque correction amount so as to change the output torque of the rotating electric machine toward a positive direction with respect to the output torque corrected by the first torque correction section.

If the shift speed of the speed change device is switched to a shift speed with a larger speed ratio, the rotational speed of the input member is changed toward the positive direction, under the condition that the rotational speed of the output member remains practically uniform. In this case, the generation of an initial explosion torque larger than expected when starting up the internal combustion engine, regardless of the normal torque correction performed by the first torque correction section, promotes changes in the rotational speed of the input member toward the positive direction and rapidly advances the shift operation.

According to the third aspect of the present invention, in such case, the torque correction amount is modified so as to change the output torque of the rotating electric machine toward the negative direction with respect to the output torque corrected by the first torque correction section. Therefore, it is possible to suppress changes in the rotational speed of the input member toward the positive direction, and appropriately suppress the rapid advancement of the shift operation. Thus, the occurrence of shift shock can be effectively suppressed.

Meanwhile, if the shift speed of the speed change device is switched to a shift speed with a smaller speed ratio, the rotational speed of the input member is changed toward the negative direction, under the condition that the rotational speed of the output member remains practically uniform. In this case, the generation of only an initial explosion torque smaller than expected when starting up the internal combustion engine, regardless of the normal torque correction performed by the first torque correction section, promotes changes in the rotational speed of the input member toward the negative direction and rapidly advances the shift operation in a similar manner.

According to the third aspect of the present invention, in such case, the torque correction amount is modified so as to change the output torque of the rotating electric machine toward the positive direction with respect to the output torque corrected by the first torque correction section. Therefore, it is possible to suppress changes in the rotational speed of the input member toward the negative direction, and appropriately suppress the rapid advancement of the shift operation. Thus, the occurrence of shift shock can be effectively suppressed.

According to a fourth aspect of the present invention, the second torque correction section may modify the torque correction amount if the initial explosion of the internal combustion engine occurs within a shift end period during which a predicted remaining shift time is equal to or less than a predetermined synchronization determination threshold. Here, the predicted remaining shift time is calculated based on a differential rotational speed between an actual rotational speed of the input member and a post-shift estimated rotational speed of the input member that is calculated based on the rotational speed of the output member, and based on a change rate of the actual rotational speed of the input member.

If the initial explosion of the internal combustion engine occurs near an end point of the shift operation in particular during the shift operation, there is a high possibility of shift shock occurring due to the rapid advancement of the shift operation, which is caused by variations in the initial explosion torque.

According to the fourth aspect of the present invention, the shift end period is determined based on the predicted remaining shift time, and the torque correction amount is modified if there is overlap between the shift end period and the occurrence of the initial explosion of the internal combustion engine. Therefore, even in such case, the occurrence of shift shock can be effectively suppressed.

According to a fifth aspect of the present invention, the second torque correction section may modify the torque correction amount if the initial explosion of the internal combustion engine occurs within the shift end period during which the differential rotational speed between the actual rotational speed of the input member and the post-shift estimated rotational speed of the input member that is calculated based on the rotational speed of the output member is equal to or less than the predetermined synchronization determination threshold.

If the initial explosion of the internal combustion engine occurs near an end point of the shift operation in particular during the shift operation, there is a high possibility of shift shock occurring due to the rapid advancement of the shift operation, which is caused by variations in the initial explosion torque.

According to the fifth aspect of the present invention, the shift end period is determined based on the predetermined differential rotational speed, and the torque correction amount is modified if there is overlap between the shift end period and the occurrence of the initial explosion of the internal combustion engine. Therefore, even in such case, the occurrence of shift shock can be effectively suppressed.

According to a sixth aspect of the present invention, the aspects of the present invention thus far described may be applied to a hybrid drive system that further includes a first rotating electric machine; a second rotating electric machine as the rotating electric machine; a drive input member that is drive-coupled to the internal combustion engine; and a differential gear device. In this hybrid drive system, the differential gear device may include, in order of rotational speed, a first rotation element, a second rotation element, and a third rotation element. The first rotation element of the differential gear device may be drive-coupled to the first rotating electric machine, the second rotation element may be drive-coupled to the drive input member, and the third rotation element may be drive-coupled to the input member and the second rotating electric machine.

According to the sixth aspect of the present invention, a so-called two-motor split type of hybrid drive system can be suitably realized. In the two-motor split type of hybrid drive system, it is possible to both suppress the occurrence of shift shock, and achieve a satisfactory response before completion of both the internal combustion engine start-up control and the shift control.

Alternatively, according to a seventh aspect of the present invention, the aspects of the present invention thus far described may be applied to a hybrid drive system that further includes a drive input member that is drive-coupled to the internal combustion engine, wherein the drive input member and the input member may be integratedly drive-coupled or selectively drive-coupled through a friction engagement device.

According to the seventh aspect of the present invention, a so-called one-motor parallel type of hybrid drive system can be suitably realized. In the one-motor parallel type of hybrid drive system, it is possible to both suppress the occurrence of shift shock, and achieve a satisfactory response before completion of both the internal combustion engine start-up control and the shift control.

DETAILED DESCRIPTION OF THE EMBODIMENTS

1. First Embodiment

Figure 1:
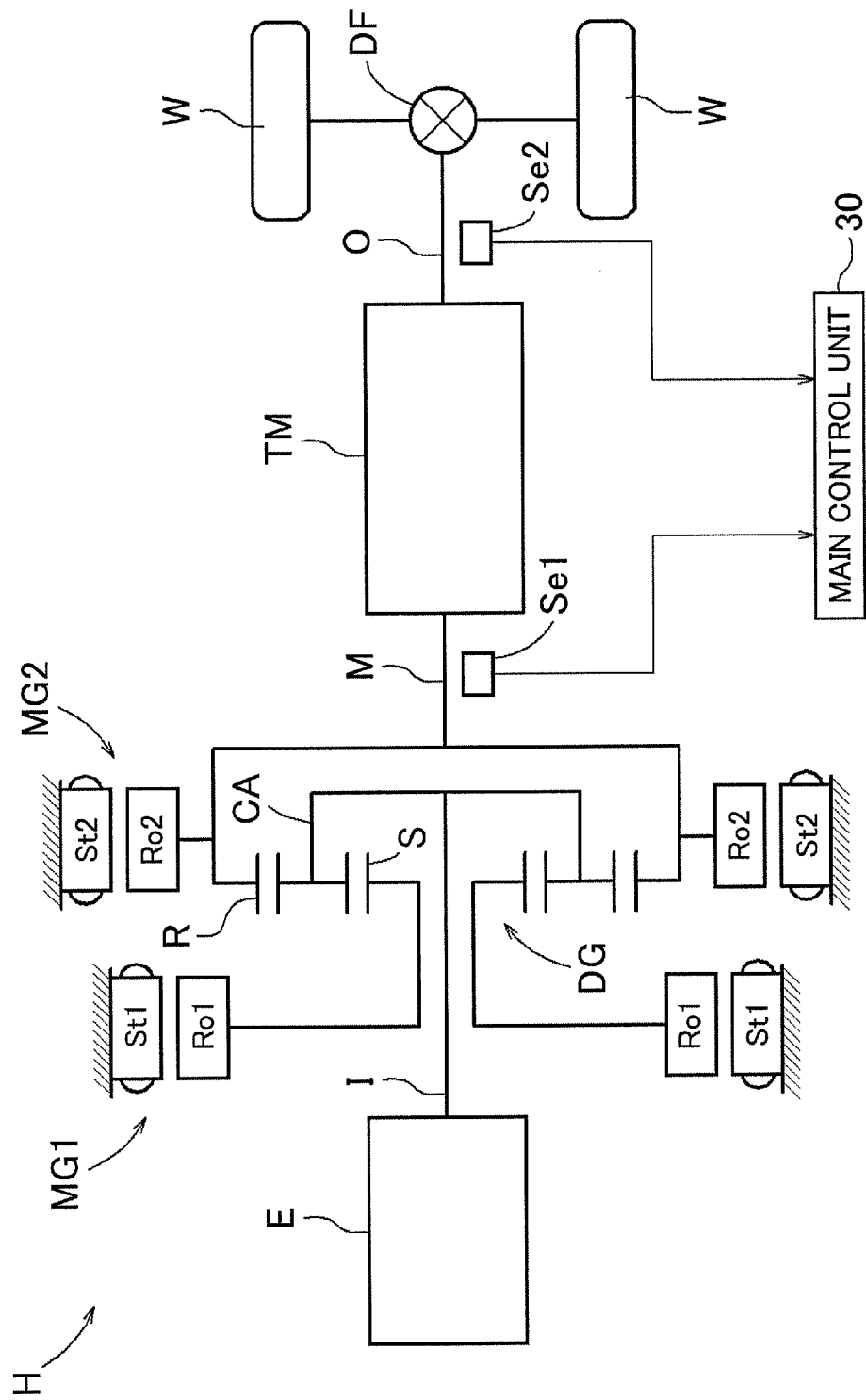
FIG. 1 is a skeleton diagram of a hybrid drive system according to a first embodiment.

A first embodiment of a hybrid drive system H according to the present invention will be described with reference to the drawings. FIG. 1 is a skeleton diagram that shows the configuration of the hybrid drive system H according to the present embodiment. The hybrid drive system H is a drive system for a hybrid vehicle that uses one or both of an internal combustion engine E and rotating electric machines MG1, MG2 as a drive power source of the vehicle. The hybrid drive system H is configured as a so-called two-motor split type of hybrid drive system.

Figure 2:
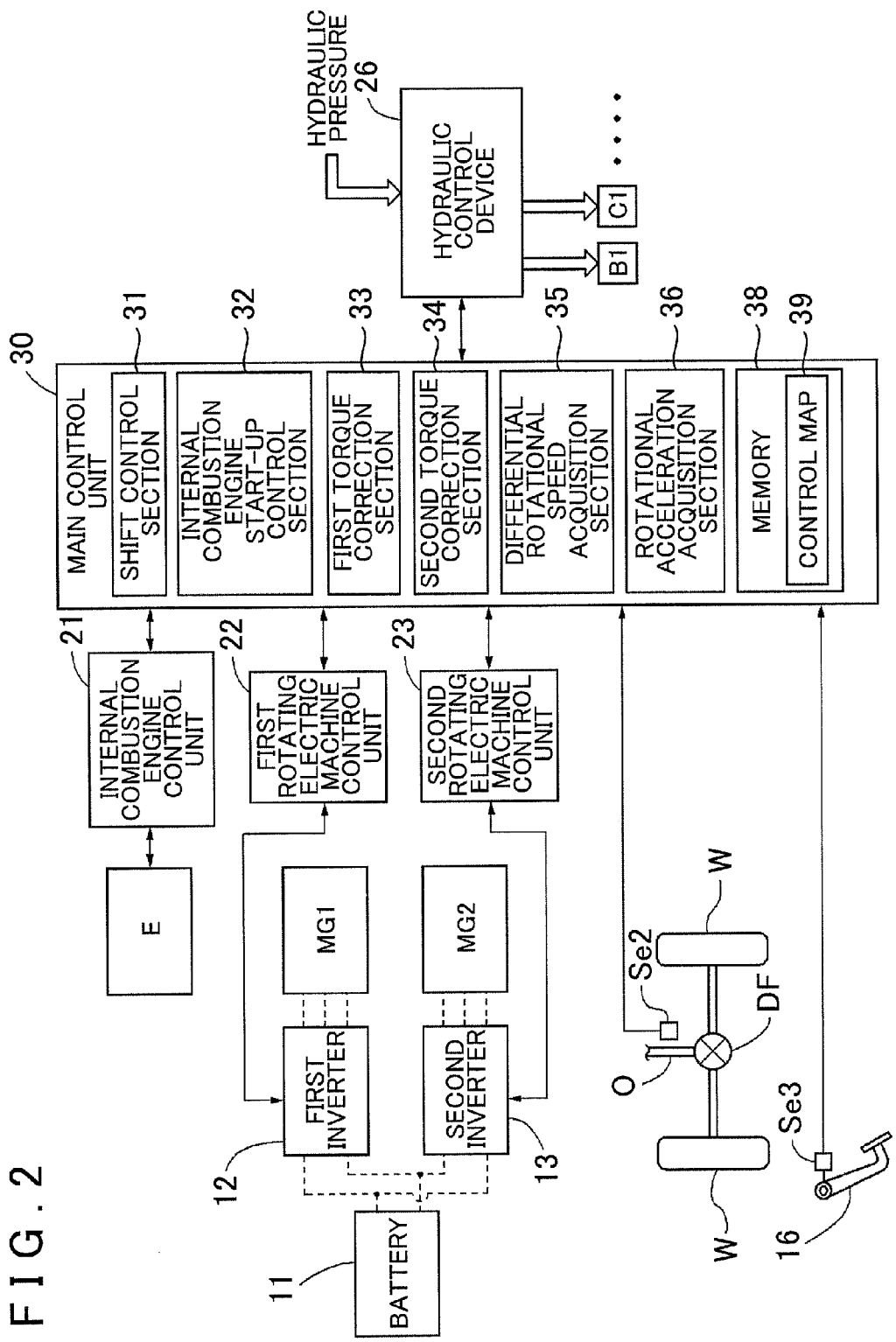
FIG. 2 is a schematic diagram that shows the system configuration of the hybrid drive system according to the first embodiment.

As shown in FIGS. 1 and 2, the hybrid drive system H according to the present embodiment includes a second rotating electric machine MG2; a shift input shaft M that is drive-coupled to the internal combustion engine E and the rotating electric machine MG2; an output shaft O that is drive-coupled to wheels W; a speed change device TM that has a plurality of switchable shift speeds, and changes the rotational speed of the shift input shaft M at a speed ratio of the respective shift speeds and transmits the changed rotational speed to the output shaft O; and a control system that at least performs an operation control for the second rotating electric machine MG2. The hybrid drive system H according to the present embodiment having the configuration described above further includes a first torque correction section 33 and a second torque correction section 34. The first torque correction section 33 corrects the output torque of the second rotating electric machine MG2 so as to cancel out torque fluctuations of the shift input shaft M that accompany the initial explosion of the internal combustion engine E. When the initial explosion of the internal combustion engine E occurs during a shift operation of the speed change device TM, the second torque correction section 34 modifies a torque correction amount Ta (see FIG. 4 and so forth) set by the first torque correction section 33 in a direction that suppresses changes in the rotational speed of the shift input shaft M that advance the shift operation. Thus, the hybrid drive system H can suppress the occurrence of shock and achieves a satisfactory response before completion of both an internal combustion engine start-up control and a shift control if an internal combustion engine start-up request and a shift request are almost simultaneously made. The hybrid drive system H according to the present embodiment will be described in detail below.

1-1. Configuration of Drive Transmission System of Hybrid Drive System

First, the configuration of a drive transmission system of the hybrid drive system H will be described. The hybrid drive system H includes an input shaft I that is drive-coupled to the internal combustion engine E; the output shaft O that is drive-coupled to the wheels W; a first rotating electric machine MG1; the second rotating electric machine MG2; a differential gear device DG; and a speed change device TM. Each of these configurations is accommodated inside a drive system case (not shown) that is fixed to a vehicle body.

The input shaft I is drive-coupled to the internal combustion engine E. Here, the internal combustion engine E is a device that is driven by the combustion of fuel therein to extract power, and various types of commonly known engines such as a gasoline engine and a diesel engine may be used, for example. In the present example, the input shaft I is drive-coupled so as to rotate together with an output rotation shaft such as a crankshaft of the internal combustion engine E. Note that the input shaft I is preferably configured so as to be drive-coupled to an output rotation shaft of the internal combustion engine E through another member such as a damper, a clutch, or the like. The input shaft I in the present embodiment corresponds to a "drive input member" of the present invention.

The first rotating electric machine MG1 includes a first stator St1 that is fixed to the drive system case; and a first rotor Ro1 that is rotatably supported on the radial inner side of the first stator St1. The first rotor Ro1 of the first rotating electric machine MG1 is drive-coupled so as to rotate together with a sun gear S of the differential gear device DG. The second rotating electric machine MG2 includes a second stator St2 that is fixed to the drive system case; and a second rotor Ro2 that is rotatably supported on the radial inner side of the second stator St2. The second rotor Ro2 of the second rotating electric machine MG2 is drive-coupled so as to rotate together with a ring gear R of the differential gear device DG and the shift input shaft M. As shown in FIG. 2, the first rotating electric machine MG1 and the second rotating electric machine MG2 are electrically connected to a battery 11, which serves as an electric storage device, through a first inverter 12 and a second inverter 13, respectively. Note that the battery 11 is only an example of the electric storage device; another electric storage device such as a capacitor may be used, or a plurality of types of electric storage devices may be used in combination.

The first rotating electric machine MG1 and the second rotating electric machine MG2 can each function as a motor (electric motor) that receives a supply of electric power to generate motive power, and also function as a generator (electric generator) that receives a supply of motive power to generate electric power. Here, one of the first rotating electric machine MG1 and the second rotating electric machine MG2 when functioning as a generator generates electricity using the torque of the internal combustion engine E and the inertia of the vehicle, and supplies electric power for charging the battery 11 or driving the other of the rotating electric machines MG1, MG2 functioning as a motor. Meanwhile, one of the first rotating electric machine MG1 and the second rotating electric machine MG2 when functioning as a motor receives a supply of electric power accumulated in the battery 11, or electric power generated by the other of the rotating electric machines MG1, MG2 functioning as a generator and performs power running. As shown in FIG. 2, an operation control for the first rotating electric machine MG1 is performed through a first rotating electric machine control unit 22 and the first inverter 12 in accordance with a control command from a main control unit 30, and an operation control for the second rotating electric machine MG2 is performed through a second rotating electric machine control unit 23 and the second inverter 13 in accordance with a control command from the main control unit 30.

As shown in FIG. 1, the differential gear device DG is configured by a single-pinion type planetary gear mechanism that is coaxially disposed with the input shaft I. Specifically, as rotation elements, the differential gear device DG includes a carrier CA that supports a plurality of pinion gears; and a sun gear S and a ring gear R that each mesh with a pinion gear. The sun gear S is drive-coupled so as to rotate together with first rotor Ro1 of the first rotating electric machine MG1. The carrier CA is drive-coupled so as to rotate together with the input shaft I. The ring gear R is an output rotation element of the differential gear device DG, and drive-coupled so as to rotate together with the shift input shaft M and the second rotor Ro2 of the second rotating electric machine MG2. These three rotation elements are, in order of rotational speed, the sun gear S, the carrier CA, and the ring gear R. Accordingly, the sun gear S, the carrier CA, and the ring gear R in the present embodiment respectively correspond to a "first rotation element", a "second rotation element", and a "third rotation element" of the present invention. The shift input shaft M that rotates together with the ring gear R serves as an input shaft of the speed change device TM. Note that, in the present example, the shift input shaft M is coaxially disposed with the input shaft I.

The differential gear DG functions as a power-distributing device that is input with the torque of the internal combustion engine E through the input shaft I, and distributes the torque to the first rotating electric machine MG1 and the shift input shaft M. While the torque of the input shaft I (internal combustion engine E) is input to the carrier CA of the differential gear device DG, the rotational speed and the torque of the first rotating electric machine MG1 are controlled so that the rotational speed of the input shaft I can be steplessly changed in speed and transmitted to the ring gear R and the shift input shaft M. An electric continuously variable speed change mechanism is thus constituted by the input shaft I, the differential gear device DG, and the first rotating electric machine MG1 working in cooperation. The shift input shaft M in the present embodiment corresponds to an "input member" of the present invention.

The shift input shaft M is drive-coupled to the speed change device TM. The speed change device TM is a device that changes the rotational speed of the shift input shaft M by a predetermined speed ratio and transmits the changed rotational speed to the output shaft O on the wheel W side. In this case, the speed change device TM according to the present embodiment is a stepped automatic transmission device that has a plurality of switchable shift speeds. In the present example, the speed change device TM includes four shift speeds (first speed, second speed, third speed, and fourth speed) with different speed ratios (see FIG. 3). Here, the "speed ratio" is a percentage by which the rotational speed of the shift input shaft M is converted in speed when the speed change device TM transmits the rotation of the shift input shaft M to the output shaft O. The speed ratio equals a value obtained by dividing the rotational speed of the shift input shaft M by the rotational speed of the output shaft O. Thus, the speed ratio represents a "speed reduction ratio" when the rotational speed of the shift input shaft M is greater than the rotational speed of the output shaft O, and represents a "speed increase ratio" when the rotational speed of the shift input shaft M is less than the rotational speed of the output shaft O. The output shaft O in the present embodiment corresponds to an "output member" of the present invention.

In order to enable switching between these shift speeds, the speed change device TM is configured to include a gear mechanism such as a planetary gear mechanism; and a plurality of friction engagement elements such as clutches and brakes. During the shift control, the engagement and disengagement of the plurality of friction engagement elements is controlled to appropriately switch between the plurality of shift speeds. The speed change device TM changes the rotational speed of the shift input shaft M by the speed ratio for the shift speed formed at that point, and transmits the changed rotational speed to the output shaft O. The rotation transmitted from the speed change device TM to the output shaft O is transmitted to the wheels W through an output differential gear device DF. Note that, in the present example, the output shaft O is coaxially disposed with the input shaft I and the shift input shaft M.

1-2. Configuration of Control System of Hybrid Drive System

Next, the configuration of a control system of the hybrid drive system H will be described. FIG. 2 is a schematic diagram that shows the system configuration of the hybrid drive system H according to the present embodiment. Note that, in FIG. 2, double solid lines indicate the transmission path of drive power (note that "drive power" is used synonymous with "torque"), dashed lines indicate the transmission path of electric power, and white arrows indicate the flow of hydraulic oil. Further note that solid arrows indicate the transmission paths of various types of information. As shown in the figure, the hybrid drive system H includes the main control unit 30 that controls various system components. The main control unit 30 is connected to an internal combustion engine control unit 21, the first rotating electric machine control unit 22, the second rotating electric machine control unit 23, and a hydraulic control device 26 in a manner that allows the mutual transfer of information. In the present embodiment, a control device is constituted by the main control unit 30, the internal combustion engine control unit 21, the first rotating electric machine control unit 22, and the second rotating electric machine control unit 23 working in cooperation.

The internal combustion engine control unit 21 controls the internal combustion engine E so as to output a desired rotational speed and torque by controlling various parts of the internal combustion engine E. The first rotating electric machine control unit 22 controls the first rotating electric machine MG1 so as to output a desired rotational speed and torque by controlling the first inverter 12. The second rotating electric machine control unit 23 controls the second rotating electric machine MG2 so as to output a desired rotational speed and torque by controlling the second inverter 13. The internal combustion engine control unit 21, the first rotating electric machine control unit 22, and the second rotating electric machine control unit 23 cooperate with one another and respectively control the operations of the internal combustion engine E, the first rotating electric machine MG1, and the second rotating electric machine MG2 so as to output a torque that corresponds to the vehicle required drive power. The hydraulic control device 26 adjusts a hydraulic pressure supplied from an oil pump (not shown), and distributes and supplies the hydraulic pressure to the plurality of friction engagement elements included in the speed change device TM, thus controlling the state (i.e., a fully engaged state, a fully disengaged state, and partially engaged states in between) of each friction engagement element. The control of the state of each friction engagement element as described above is performed based on a control command from the main control unit 30.

In order to acquire information regarding various parts of the vehicle mounted with the hybrid drive system H, the main control unit 30 is also configured capable of acquiring information from sensors and the like provided in various parts of the vehicle. In the example shown in FIGS. 1 and 2, the main control unit 30 is configured capable of acquiring information from a shift input shaft rotational speed sensor Se1, a vehicle speed sensor Se2, and an accelerator operation amount detection sensor Se3. The shift input shaft rotational speed sensor Se1 is a sensor that detects the rotational speed of the shift input shaft M. The vehicle speed sensor Se2 is a sensor that detects the rotational speed of the output shaft O in order to detect the vehicle speed. The accelerator operation amount detection sensor Se3 is a sensor that detects the accelerator operation amount by detecting the amount that an accelerator pedal 16 is operated. Information that indicates the respective detection results from the sensors Se1 to Se3 is output to the main control unit 30.

The main control unit 30 functions as a core member that performs is operation controls for various parts of the hybrid drive system H. The main control unit 30 has as its core member a computation processing device such as a CPU, and is configured to include storage devices such as a RAM from which the computation processing device can read data and write data to, and a ROM from which the computation processing device can read data. Each functional portion 31 to 36 of the main control unit 30 is configured from software (a program) stored in the ROM or the like, hardware such as a computation circuit separately provided, or both software and hardware. The functional portions 31 to 36 are configured capable of exchanging information with each other. The functional portions 31 to 36 of the main control unit 30 will be described in detail below.

Figure 3:
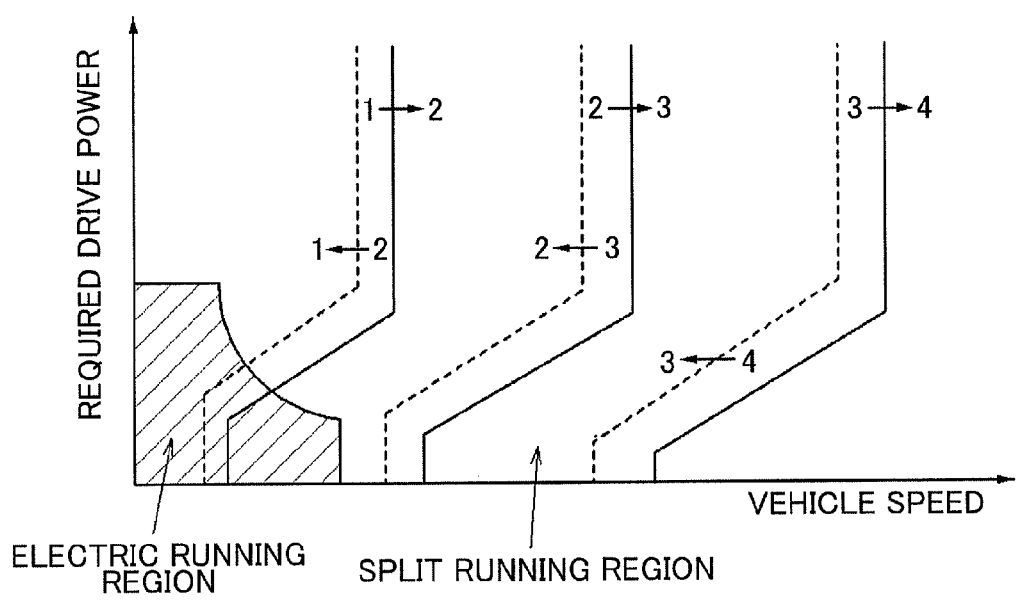
FIG. 3 is a diagram that shows an example of a control map provided in the hybrid drive system according to the first embodiment.

The shift control section 31 is a functional portion that controls the shift operation of the speed change device TM. The shift control section 31 functions as a shift control unit. The shift control section 31 performs a control that sets a target shift speed of the speed change device TM based on the vehicle required drive power and the vehicle speed, and changes the shift speed of the speed change device TM by controlling the operation of the friction engagement elements, e.g., clutches and brakes, depending on the set target shift speed. Here, the vehicle required drive power is set based on the accelerator operation amount and the vehicle speed. The accelerator operation amount is detected by the accelerator operation amount detection sensor Se3, and the vehicle speed is detected by the vehicle speed sensor Se2. FIG. 3 shows an example of a control map 39 that describes the relationship that the required drive power and the vehicle speed have with the target shift speed. The control map 39 sets a plurality of upshift lines that specify the upshift schedule, and a plurality of downshift lines that specify the downshift schedule. Here, "upshift" means switching from a shift speed to a shift speed with a smaller speed ratio, and "downshift" means switching from a shift speed to a shift speed with a larger speed ratio. On the control map 39, a shift request is created when an operation point determined based on the vehicle required drive power and the vehicle speed crosses an upshift line or a downshift line.

The shift control section 31 executes the shift control after receiving a shift request. When changing the shift speed, the shift control section 31 performs so-called changeover shifting in which the shift control section 31 disengages one of the friction engagement elements that was engaged before the speed change, and engages one of the friction engagement elements that was disengaged before the speed change. During such changeover shifting, the shift operation is advanced through a torque phase Pt and an inertia phase Pi. Here, the "torque phase Pt" refers to a period that spans from a point at which the friction engagement element to be engaged starts to take on a transmission torque capacity to a point at which the rotational speed of the shift input shaft M starts to change. More specifically, the torque phase Pt refers to a period that spans from a point at which a hydraulic pressure supplied to the friction engagement element to be engaged becomes equal to or greater than a stroke end pressure of the friction engagement element to a point at which an actual rotational speed Nm of the shift input shaft M becomes greater than a pre-shift estimated rotational speed Na of the shift input shaft M that is calculated based on the rotational speed of the output shaft O (see FIG. 4 and so forth). Further, the "inertia phase Pi" refers to a period during which the rotational speed of the shift input shaft M changes as the shift operation advances. More specifically, the inertia phase Pi refers to a period during which the actual rotational speed Nm of the shift input shaft M changes from the pre-shift estimated rotational speed Na of the shift input shaft M toward a post-shift estimated rotational speed Mb, which are calculated based on the rotational speed of the output shaft O.

The internal combustion engine start-up control section 32 is a functional portion that performs a start-up control of the stopped internal combustion engine E. The internal combustion engine start-up control section 32 functions as an internal combustion engine start-up control unit. The control map 39 shown in FIG. 3 sets a mode switchover line that specifies the transition schedule between an electric running region in which the vehicle runs using the torque of the second rotating electric machine MG2, and a split running region in which the vehicle runs using the torque of the internal combustion engine E while generating electricity in the first rotating electric machine MG1. On the control map 39, an internal combustion engine start-up request is created when an operation point determined based on the vehicle required drive power and the vehicle speed crosses the mode switchover line and moves from the electric running region to the split running region. After receiving the internal combustion engine start-up request, the internal combustion engine start-up control section 32 starts up the internal combustion engine E by controlling the rotational speed and the torque of the first rotating electric machine MG1 through the first rotating electric machine control unit 22, and controlling the torque of the second rotating electric machine MG2 through the second rotating electric machine control unit 23.

More specifically, the internal combustion engine start-up control section 32 increases the torque of the second rotating electric machine MG2 that is drive-coupled to the ring gear R of the differential gear device DG, and increases the rotational speed and the torque of the first rotating electric machine MG1 that is drive-coupled to the sun gear S, which increases the rotational speed of the internal combustion engine E through the input shaft I that is drive-coupled to the carrier CA. When an ignition-start rotational speed Nf (see FIG. 4 and so forth) is reached soon after increasing the rotational speed of the internal combustion engine E, the internal combustion engine start-up control section 32 starts up the internal combustion engine E by starting fuel injection to the combustion chamber of the internal combustion engine E and igniting the injected fuel inside the combustion chamber. Note that, in the present embodiment, the internal combustion engine start-up control section 32 also has a function for performing a stop control of the internal combustion engine E. The internal combustion engine start-up control section 32 stops the internal combustion engine E by stopping the supply of fuel to the internal combustion engine E.

When the internal combustion engine E is stopped, the pressure inside the intake pipe corresponds to the atmosphere pressure, and a larger amount of air is present inside the intake pipe compared to when the internal combustion engine E is performing normal driving. Therefore, the internal combustion engine E ignites under a condition of excess air, which causes the internal combustion engine E at start-up to output a large torque and sharply increase in speed. Here, the generated torque at start-up of the internal combustion engine E will be called an "initial explosion torque". Generation of the initial explosion torque produces torque fluctuations in the shift input shaft M, and such torque fluctuations of the shift input shaft M may be transmitted to the output shaft O through the speed change device TM. The torque fluctuations transmitted to the output shaft O may produce a shock felt by the driver of the vehicle, so the transmission of such torque fluctuations to the output shaft O should be suppressed as much as possible. For this purpose, the main control unit 30 according to the present embodiment includes the first torque correction section 33.

The first torque correction section 33 is a functional portion that corrects the output torque of the second rotating electric machine MG2 so as to cancel out the torque fluctuations of the shift input shaft M that accompany the initial explosion of the internal combustion engine E. The first torque correction section 33 functions as a first torque correction unit. As explained above, because the initial explosion torque generated from the initial explosion of the internal combustion engine E produces torque fluctuations in the shift input shaft M, the first torque correction section 33 corrects the output torque of the second rotating electric machine MG2 so as to cancel out the torque fluctuations of the shift input shaft M caused by the initial explosion torque.

The second torque correction section 34 is a functional portion that, when the initial explosion of the internal combustion engine E occurs during a shift operation of the speed change device TM, modifies the torque correction amount Tα (see FIG. 4 and so forth) set by the first torque correction section 33 in a direction that suppresses changes in the rotational speed of the shift input shaft M that advance the shift operation. In other words, using the torque correction amount Tα set by the first torque correction section 33 as a reference, the second torque correction section 34 modifies the torque correction amount in a direction that produces changes in the rotational speed of the shift input shaft M that slow the shift operation. The second torque correction section 34 functions as a second torque correction unit.

In the present embodiment, the corrections made by the first torque correction section 33 and the second torque correction section 34 to the output torque of the second rotating electric machine MG2 will be collectively called an "initial explosion torque correction".

1-3. Initial Explosion Torque Correction Control Content

Next, the content of an initial explosion torque correction control according to the present embodiment will be described in detail. As explained above, the first torque correction section 33 corrects the output torque of the second rotating electric machine MG2 so as to cancel out the torque fluctuations of the shift input shaft M that accompany the initial explosion of the internal combustion engine E. In other words, the first torque correction section 33 corrects the output torque of the second rotating electric machine MG2 by subtracting (removing) a torque whose magnitude corresponds to the torque fluctuation amount of the shift input shaft M caused by the initial explosion torque from the output torque, and transmitting the resulting torque to the shift input shaft M. Here, an output torque $T2c$ of the second rotating electric machine MG2 after correction by the first torque correction section 33 is $$T2c = T2 - T\alpha$$

where, $T2$ is an output torque of the second rotating electric machine MG2 that is set based on the required drive power, and $T\alpha$ is a predetermined torque correction amount.

In the present embodiment, the torque correction amount $T\alpha$ is specified as a time function. That is, the torque correction amount $T\alpha$ in the present embodiment is specified as an amount that changes over time. In the present example, as specifically shown in the timing charts of FIGS. 4 and 5, the torque correction amount $T\alpha$ is specified as a value that from a start point of initial explosion torque correction (T04 in FIG. 4, T14 in FIG. 5) increases at a predetermined rate for a predetermined time (T04 to T05, T14 to T15), and then decreases at a predetermined rate soon after to zero (T05 to T06, T15 to T16). The torque correction amount $T\alpha$ is acquired as an empirical value that is calculated by way of experiment in advance and set uniform as a general rule. Note that the relationship between the elapsed time and the torque correction amount $T\alpha$ is stored in a memory 38 as a map or an equation. Further note that the torque correction amount $T\alpha$ may be preferably set based on various parameters related to the operation of the internal combustion engine E such as the coolant temperature. In such case, for example, the relationships between the operation parameters and the torque correction amount $T\alpha$ in various conditions may be calculated by way of experiment and stored in the memory 38 as a map, and the torque correction amount $T\alpha$ calculated based on the detected operation parameters and the map. Moreover, in the present embodiment, after the internal combustion engine start-up control section 32 starts fuel injection to and ignites the internal combustion engine E, the first torque correction section 33 performs the initial explosion torque correction with the start point set as the point (T04, T14) following the elapse of a predetermined time.

An excess air amount when the internal combustion engine E is started up is an amount that is not uniform and varies within a certain range. Therefore, the magnitude of the initial explosion torque may also vary within a certain range. Thus, even if the first torque correction section 33 corrects the output torque of the second rotating electric machine MG2 so as to cancel out the torque fluctuations of the shift input shaft M caused by the initial explosion torque, the uniformly set torque correction amount $T\alpha$ cannot completely cancel out the initial explosion torque that may vary within a certain range. For example, if the initial explosion torque is larger than the expected magnitude, the remaining initial explosion torque that could not be absorbed with the predetermined torque correction amount $T\alpha$ acts to increase the rotational speed of the shift input shaft M. However, if the initial explosion torque is smaller than the expected magnitude, the remaining torque correction amount $T\alpha$ after the torque correction amount $T\alpha$ cancels out the initial explosion torque acts to decrease the rotational speed of the shift input shaft M.

Figure 10:
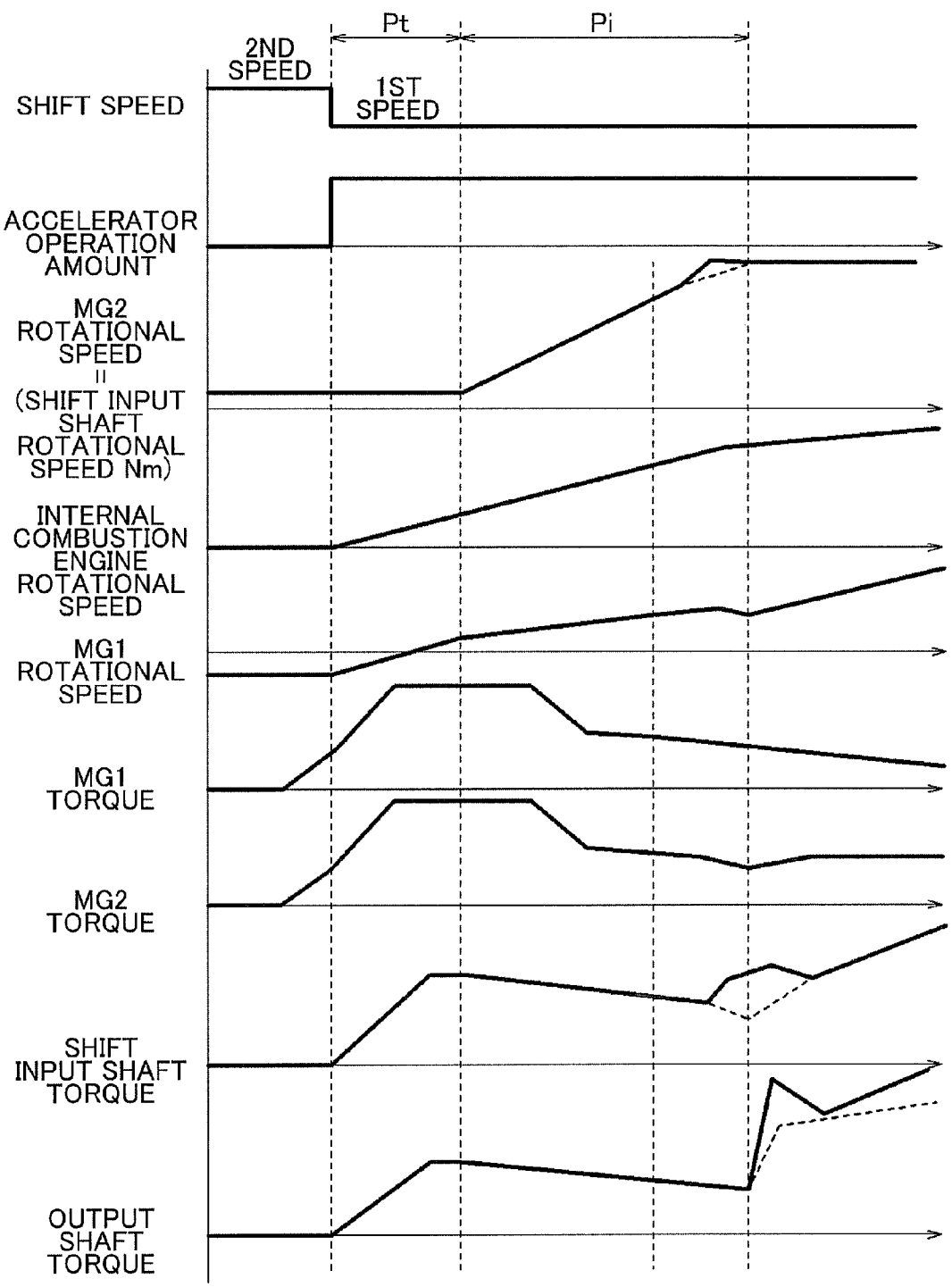
FIG. 10 is a timing chart that shows an initial explosion torque correction control according to related art.

Such changes in the rotational speed of the shift input shaft M based on variations in the magnitude of the initial explosion torque pose almost no problem because the internal combustion engine start-up request is made in a situation where no shift request is made, and also because when the internal combustion engine start-up control is executed alone, the remaining initial explosion torque that is not completely canceled out is simply transmitted to the wheels W. However, if the internal combustion engine start-up request and the shift request are almost simultaneously made and there is overlap between the generation of initial explosion torque and the shift operation of the speed change device TM, a shift shock may occur during the shift operation. Namely, when the magnitude of the initial explosion torque actually generated at start-up of the internal combustion engine E is larger or smaller than expected, the shift operation rapidly advances based on a relationship with the direction of changes in the rotational speed of the shift input shaft M during the shift operation, and a shift shock may thus occur during the shift operation. As an example, FIG. 10 shows a timing chart of the generation of a larger-than-expected initial explosion torque during a downshift. In this case, the rotational speed of the shift input shaft M sharply increases during the shift operation, and the torque of the shift input shaft M and the torque of the output shaft O greatly fluctuate. Such fluctuations in the torque of the output shaft O lead to the occurrence of a shift shock. Note that, for comparison purposes, dashed lines indicate the operation states of various parts when the initial explosion torque is generated as expected.

It should also be noted that the shift shock described above is especially prone to occur when the initial explosion torque is generated near an end point of the shift operation. The second torque correction section 34 included in the main control unit 30 according to the present embodiment has a function for resolving such an issue when there is overlap between the generation of the initial explosion torque and the shift operation of the speed change device TM.

The second torque correction section 34, when the initial explosion of the internal combustion engine E occurs during the shift operation of the speed change device TM, modifies the torque correction amount Tα set by the first torque correction section 33 in a direction that suppresses changes in the rotational speed of the shift input shaft M that advance the shift operation. Note that in order to distinguish between the torque correction amount Tα set by the first torque correction section 33 and the modified torque correction amount set by the second torque correction section 34 in the description below, the former will be referred to as a basic torque correction amount Tα and the latter will be referred to simply as a torque correction amount Tγ.

In the present embodiment, the second torque correction section 34 determines whether a shift operation is underway based on whether the inertia phase Pi is underway at that point during changing of the shift speed. As explained above, the inertia phase Pi is a period during which the actual rotational speed Nm of the shift input shaft M changes from the pre-shift estimated rotational speed Na of the shift input shaft M toward the post-shift estimated rotational speed Nb, which are calculated based on the rotational speed of the output shaft O. The determination as to whether the inertia phase Pi is underway is made based on information acquired by a differential rotational speed acquisition section 35.

Here, the differential rotational speed acquisition unit 35 is a functional portion that acquires a differential rotation speed, which is the rotational speed difference between the actual rotational speed Nm of the shift input shaft M and a predetermined reference rotational speed. In the present embodiment, the differential rotational speed acquisition section 35 acquires a first differential rotational speed ΔNa between the actual rotational speed Nm of the shift input shaft M and the pre-shift estimated rotational speed Na, and a second differential rotational speed ΔNb between the actual rotational speed Nm of the shift input shaft M and the post-shift estimated rotational speed Nb. Note that the actual rotational speed Nm of the shift input shaft M is acquired by detection using the shift input shaft rotational speed sensor Se1. In addition, the pre-shift estimated rotational speed Na is acquired as the product of the rotational speed of the output shaft O, which is acquired by detection using the vehicle speed sensor Se2, and the speed ratio of the target shift speed before shifting. Moreover, the post-shift estimated rotational speed Nb is acquired as the product of the rotational speed of the output shaft O, which is acquired by detection using the vehicle speed sensor Se2, and the speed ratio of the target shift speed after shifting.

The second torque correction section 34 determines the start point of the inertia phase Pi as a point (T02, T12) at which the first differential rotational speed ΔNa reaches a magnitude that is equal to or greater than a predetermined value. The second torque correction section 34 also determines the end point of the inertia phase Pi as a point (T05, T15) at which the second differential rotational speed ΔNb reaches a magnitude that is equal to or less than a predetermined value. In the present example, the predetermined values in these cases are zero ("0"). However, the present invention is not limited to this example and values such as 0 to 100 (rpm) may also be set.

Further, in the present embodiment, the second torque correction section 34 determines whether at that point a predetermined "shift end period Pe" in particular is underway within the inertial phase Pi. Here, in the present embodiment, the second torque correction section 34 determines whether the shift end period Pe is underway based on the second differential rotational speed ΔNb acquired by the differential rotational speed acquisition section 35. Specifically, the second torque correction section 34 determines that the shift end period Pe is underway if the second differential rotational speed ΔNb at that point is equal to or less than a predetermined synchronization determination differential rotational speed ΔNs set in advance (see FIG. 4 and so forth). As the synchronization determination differential rotational speed ΔNs, a value such as 300 to 1,000 (rpm) may be set. A value such as 500 to 600 (rpm) is preferred. The synchronization determination differential rotational speed ΔNs in the present embodiment corresponds to a "synchronization determination threshold" of the present invention.

According to the present embodiment, the second torque correction section 34 determines that the initial explosion of the internal combustion engine E has occurred after a predetermined time, using a point (T03, T13) at which the rotational speed of the internal combustion engine E increases and reaches the ignition-start rotational speed Nf as a reference. As the predetermined time in such case, a value such as 50 to 200 (ms) may be set.

The second torque correction section 34 changes the basic torque correction amount Tα if a point (T04, T14) after the elapse of the predetermined time that uses the point (T03, T13) at which the ignition-start rotational speed Nf is reached as a reference falls inside the shift end period Pe within the inertia phase Pi, that is, if the second differential rotational speed ΔNb is greater than zero and equal to or less than the synchronization determination differential rotational speed ΔNs. In the present embodiment, the second torque correction section 34 adds a special torque correction amount Tβ to the basic torque correction amount Tα, whereby the basic torque correction amount Tα is modified to obtain a torque correction amount Tγ (Tγ=Tα+Tβ). In this case, an output torque T2c' of the second rotating electric machine MG2 after correction by the second torque correction section 34 is as follows.

$$T2c' = T2 - T\gamma = T2c - T\beta$$

Figure 4:
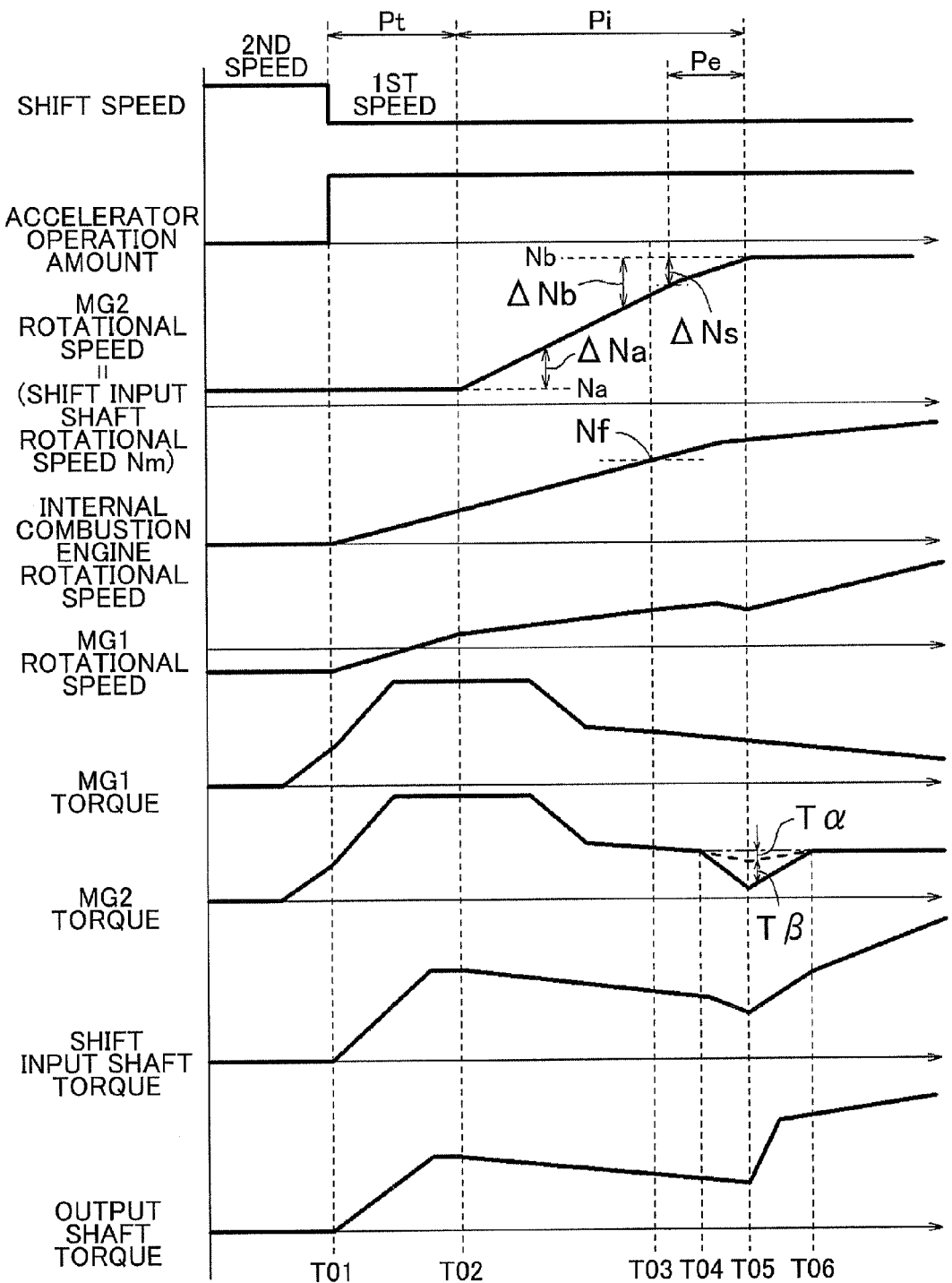
FIG. 4 is a timing chart that shows an example of the operation states of various parts based on an initial explosion torque correction control according to the first embodiment.

Here, depending on the direction in which the shift speed of the speed change device TM is switched, the second torque correction section 34 modifies the basic torque correction amount Tα in a direction that suppresses changes in the rotational speed of the shift input shaft M that advance the shift operation. If the shift speed of the speed change device TM is switched by the shift control to a shift speed with a larger speed ratio (if the speed change device TM is downshifted), as shown in FIG. 4, the second torque correction section 34 modifies the basic torque correction amount Tα so as to change the output torque of the second rotating electric machine MG2 toward the negative direction. In the present embodiment, the second torque correction section 34 adds the special torque correction amount Tβ that is set to a positive value (Tβ>0) to the basic torque correction amount Tα, whereby the torque correction amount Tγ that is increased from the basic torque correction amount Tα is determined (Tγ=Tα+Tβ). Thus, the output torque T2c' (shown by a solid line in FIG. 4) of the second rotating electric machine MG2 after correction by the second torque correction section 34 is smaller than the output torque T2c (shown by a dashed line in FIG. 4) of the second rotating electric machine MG2 after correction by the first torque correction section 33. Note that, similar to the basic torque correction amount Tα, the special torque correction amount Tβ described above is specified as a value that, using the start point of the initial explosion torque correction as a reference, increases at a predetermined rate and then decreases at a predetermined rate soon after to zero. The special torque correction amount Tβ is also acquired as an empirical value that is calculated by way of experiment in advance and set uniform as a general rule (likewise hereafter).

During downshifting, under the assumption that the vehicle speed and the rotational speed of the output shaft O remain practically uniform, the rotational speed of the shift input shaft M increases. If the initial explosion torque is larger than the expected magnitude in this case, the remaining initial explosion torque that could not be absorbed by the basic torque correction amount $T\alpha$ acts to increase the rotational speed of the shift input shaft M. With regard to this point, in the present embodiment, if the initial explosion of the internal combustion engine E occurs in the shift end period Pe, the output torque of the second rotating electric machine MG2 is corrected by the torque correction amount $T\gamma$ that is increased from the basic torque correction amount $T\alpha$. Thus, an increase in the rotational speed of the shift input shaft M is more suppressed compared to no correction by the second torque correction section 34 (correction by only the first torque correction section 33). Accordingly, rapid advancing of the shift operation in the shift end period Pe can be appropriately suppressed, and the occurrence of shift shock can be effectively suppressed. In a comparison between the timing chart of FIG. 4 and the timing chart of FIG. 10 described earlier that shows problems with the related art, it is clear that the torque fluctuations of the output shaft O are suppressed and the occurrence of shift shock is effectively suppressed. Note that, as evident from the above description, the internal combustion engine start-up control and the shift control are simultaneously executed in parallel in the present embodiment. Therefore, a highly satisfactory response before completion of both the internal combustion engine start-up control and the shift control is achieved.

In the example described above, if the initial explosion torque is smaller than the expected magnitude, the remaining torque correction amount $T\alpha$ after the torque correction amount $T\alpha$ cancels out the initial explosion torque acts to decrease the rotational speed of the shift input shaft M. In this case as well, if the initial explosion of the internal combustion engine E occurs in the shift end period Pe, the output torque of the second rotating electric machine MG2 is corrected by the torque correction amount $T\gamma$ that is increased from the basic torque correction amount $T\alpha$. Thus, an increase in the rotational speed of the shift input shaft M is more suppressed compared to no correction by the second torque correction section 34, and the shift operation itself is somewhat slowed in the shift end period Pe. Despite this, because the internal combustion engine start-up control and the shift control are simultaneously executed in parallel, a more satisfactory response before completion of both the internal combustion engine start-up control and the shift control is achieved compared to when these are sequentially executed. Note that, since the shift operation does not rapidly advance in the shift end period Pe, the occurrence of shift shock hardly becomes a problem.

Figure 5:
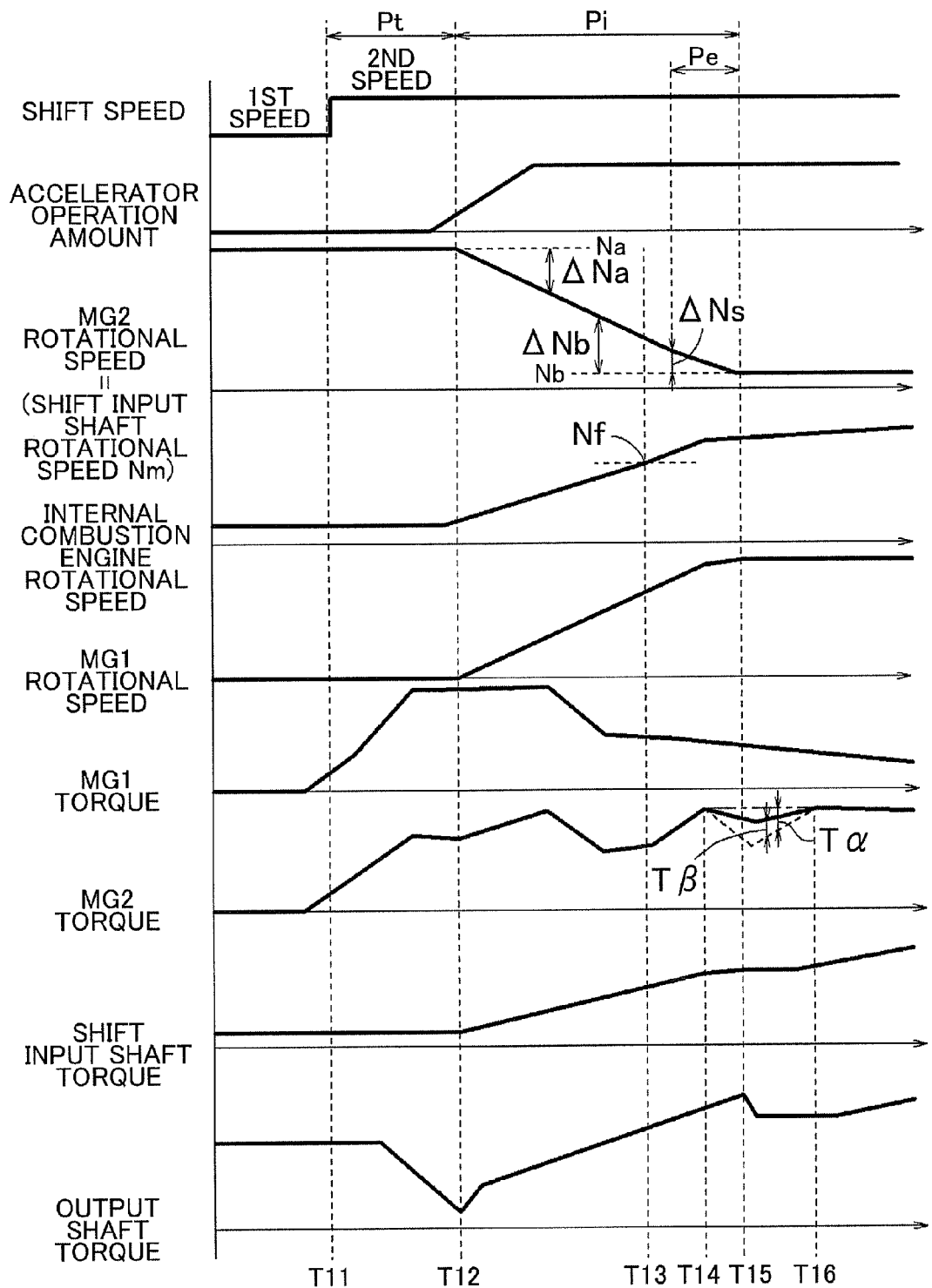
FIG. 5 is a timing chart that shows another example of the operation states of various parts based on the initial explosion torque correction control according to the first embodiment.

Meanwhile, if the shift speed of the speed change device TM is switched by the shift control to a shift speed with a smaller speed ratio (if the speed change device TM is upshifted), as shown in FIG. 5, the second torque correction section 34 modifies the basic torque correction amount $T\alpha$ so as to change the output torque of the second rotating electric machine MG2 toward the positive direction. In the present embodiment, the second torque correction section 34 adds the special torque correction amount $T\beta$ that is set to a negative value ($T\beta<0$) to the basic torque correction amount $T\alpha$, whereby the torque correction amount $T\gamma$ that is decreased from the basic torque correction amount $T\alpha$ is determined ($T\gamma=T\alpha+T\beta$). Thus, the output torque $T2c'$ (shown by a solid line in FIG. 5) of the second rotating electric machine MG2 after correction by the second torque correction section 34 is larger than the output torque $T2c$ (shown by a dashed line in FIG. 5) of the second rotating electric machine MG2 after correction by the first torque correction section 33.

During upshifting, under the assumption that the vehicle speed and the rotational speed of the output shaft O remain practically uniform, the rotational speed of the shift input shaft M decreases. In this case, if the initial explosion torque is smaller than the expected magnitude, the remaining torque correction amount $T\alpha$ after the torque correction amount $T\alpha$ cancels out the initial explosion torque acts to decrease the rotational speed of the shift input shaft M. With regard to this point, in the present embodiment, if the initial explosion of the internal combustion engine E occurs in the shift end period Pe, the output torque of the second rotating electric machine MG2 is corrected by the torque correction amount $T\gamma$ that is decreased from the basic torque correction amount $T\alpha$. Thus, a decrease in the rotational speed of the shift input shaft M is more suppressed compared to no correction by the second torque correction section 34 (correction by only the first torque correction section 33). Accordingly, rapid advancing of the shift operation in the shift end period Pe can be appropriately suppressed, and the occurrence of shift shock can be effectively suppressed. Note that, similar to downshifting, a highly satisfactory response before completion of both the internal combustion engine start-up control and the shift control is achieved.

If the initial explosion torque is larger than the expected magnitude in this case, the remaining initial explosion torque that could not be absorbed by the basic torque correction amount $T\alpha$ acts to increase the rotational speed of the shift input shaft M. In this case as well, if the initial explosion of the internal combustion engine E occurs in the shift end period Pe, the output torque of the second rotating electric machine MG2 is corrected by the torque correction amount $T\gamma$ that is decreased from the basic torque correction amount $T\alpha$. Thus, a decrease in the rotational speed of the shift input shaft M is more suppressed compared to no correction by the second torque correction section 34, and the shift operation itself is somewhat slowed in the shift end period Pe. Despite this, similar to downshifting, a satisfactory response before completion of both the internal combustion engine start-up control and the shift control is achieved, and the occurrence of shift shock hardly becomes a problem.

1-4. Initial Explosion Torque Correction Control Procedure

Figure 6:
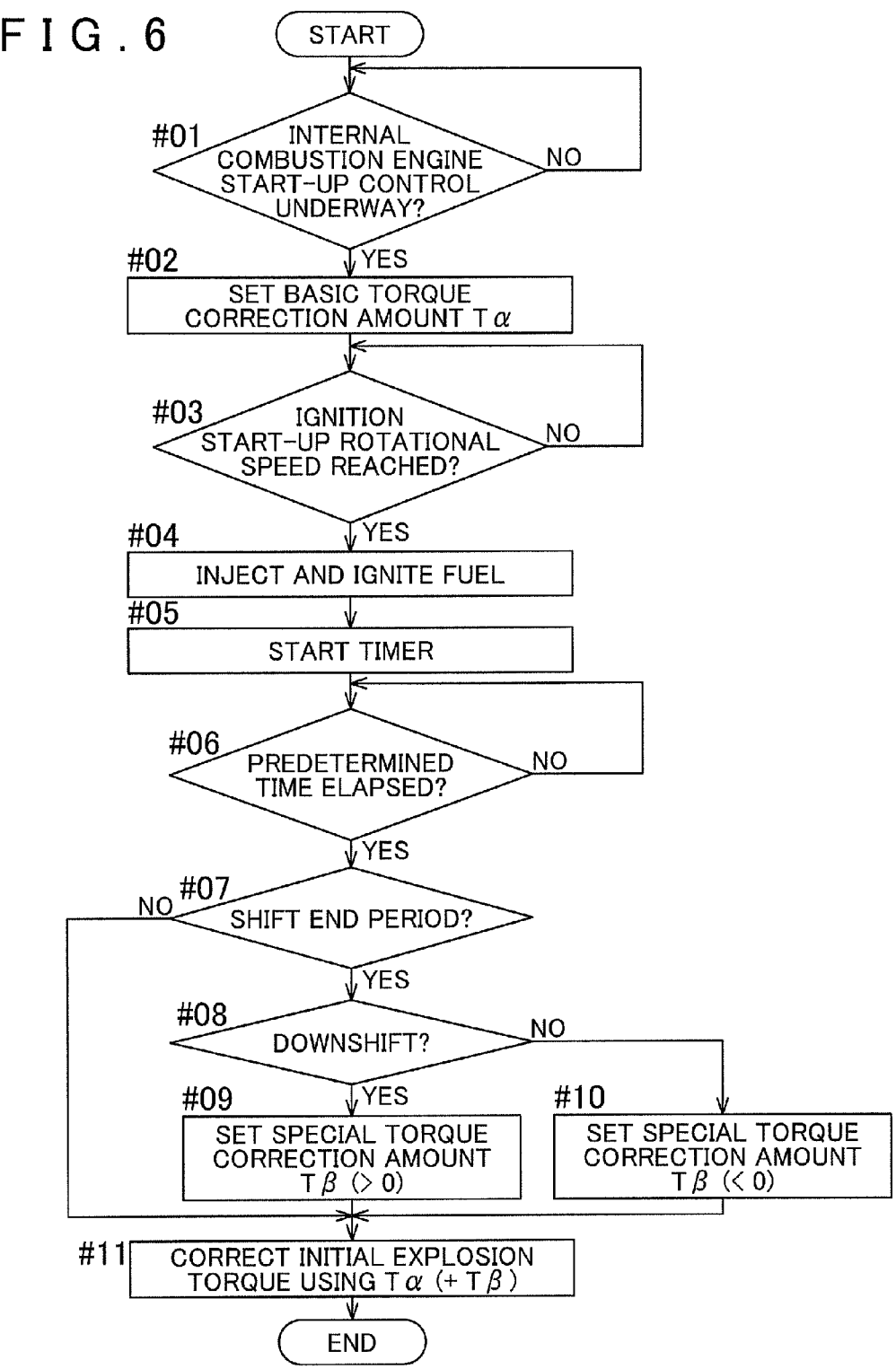
FIG. 6 is a flowchart that shows the procedure of the initial explosion torque correction control according to the first embodiment.

Next, the procedure of the initial explosion torque correction control of the hybrid drive system H according to the present embodiment will be described. FIG. 6 is a flowchart that shows the procedure of the initial explosion torque correction control according to the present embodiment. The procedure of the initial explosion torque correction control process described below is executed by functional portions, namely, the main control unit 30, the internal combustion engine control unit 21, the first rotating electric machine control unit 22, and the second rotating electric machine control unit 23. If these functional portions are configured by programs, a computation processing device that includes the control units operates as a computer that executes the programs configuring each functional portion.

As shown in FIG. 6, first, it is determined whether the internal combustion engine start-up control is underway (step #01). This determination may be made based on the internal combustion engine start-up request, for example. If it is determined that the internal combustion engine start-up control is underway (step #01: Yes), the first torque correction section 33 sets the basic torque correction amount $T\alpha$, (step #02). When the ignition-start rotational speed Nf is reached soon after the internal combustion engine start-up control increases the rotational speed of the internal combustion engine E (step #03: Yes), the internal combustion engine E is started up by starting fuel injection to the combustion chamber of the internal combustion engine E and igniting the fuel (step #04). A timer is started at a point when the rotational speed of the internal combustion engine E reaches the ignition-start rotational speed Nf (step #05). At a point when a predetermined time has elapsed after starting the timer (step #06: Yes), it is determined whether that point falls within the shift operation (in the present example, the shift end period Pe in the inertia phase Pi) (step #07).

If it is determined that the point falls within the shift operation (shift end period Pe) (step #07: Yes), the shifting is determined as a downshift (step #08). If a downshift is determined (step #08: Yes), the second torque correction section 34 sets the special torque correction amount Tβ that is a positive value (Tβ>0) (step #09). However, if a downshift is not determined, that is, if the shifting is determined as an upshift (step #08: No), the second torque correction section 34 sets the special torque correction amount Tβ that is a negative value (Tβ<0) (step #10). The second torque correction section 34 then performs an initial explosion torque correction by correcting the output torque of the second rotating electric machine MG2 (step #11). At such time, the second torque correction section 34 corrects the output torque of the second rotating electric machine MG2 based on the torque correction amount Tγ, which is acquired by adding the special torque correction amount Tβ to the basic torque correction amount Tα (Tγ=Tα+Tβ).

Note that, if it is determined that the point does not fall within the shift operation (shift end period Pe) at step #07, that is, if the shift control is not underway, or if the shift control is underway but the point comes before the shift end period Pe (step #07: No), the first torque correction section 33 performs an initial explosion torque correction by correcting the output torque of the second rotating electric machine (step #11). At such time, the first torque correction section 33 corrects the output torque of the second rotating electric machine MG2 based on only the basic torque correction amount Tα. The initial explosion torque correction control is thereby ended.

2. Second Embodiment

Figure 7:
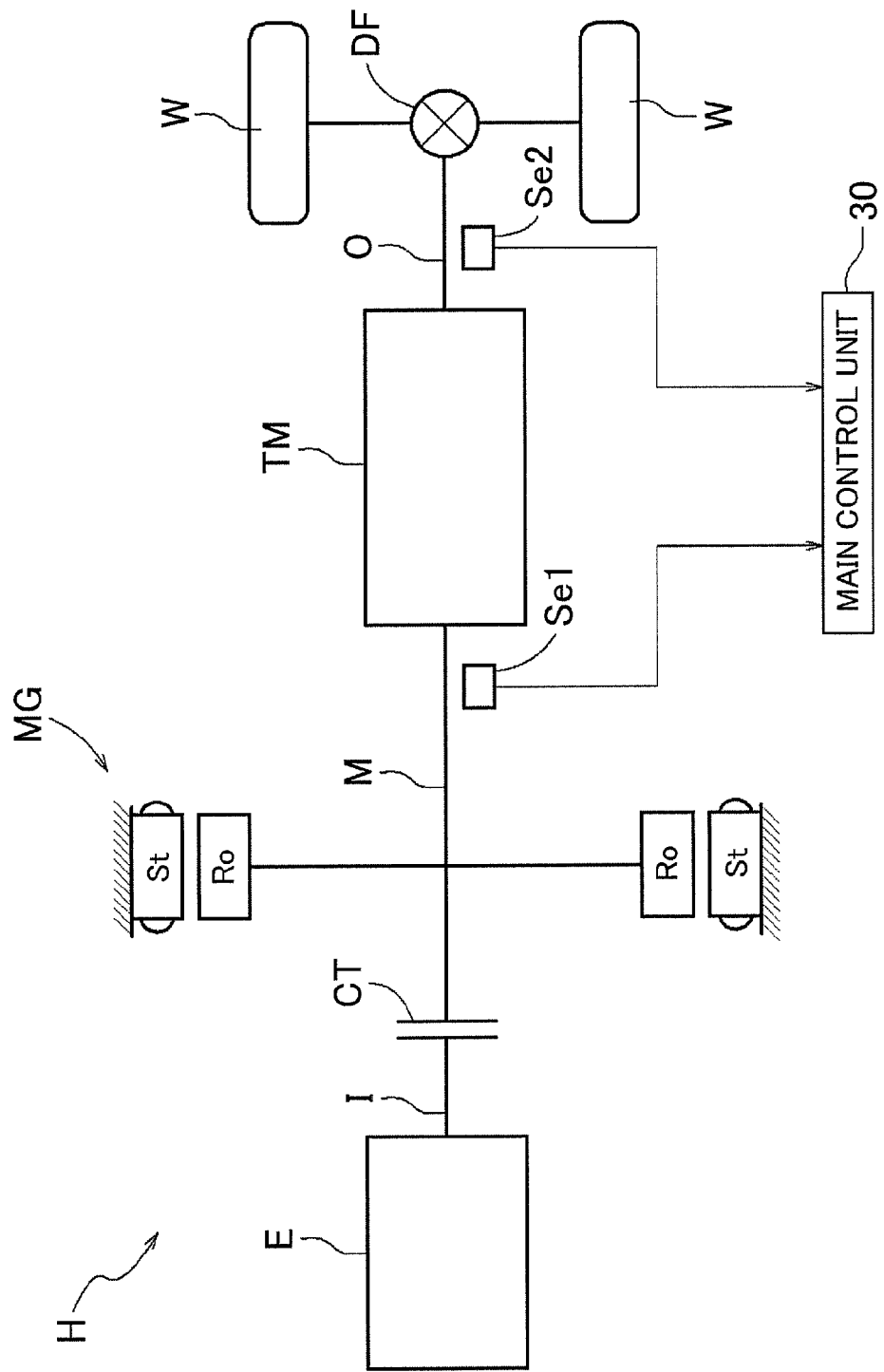
FIG. 7 is a skeleton diagram of the hybrid drive system according to a second embodiment.

A second embodiment of the hybrid drive system according to the present invention will be described based on the drawings. FIG. 7 is a skeleton diagram that shows the configuration of the hybrid drive system H according to the present embodiment. The hybrid drive system H is configured as a so-called one-motor parallel type of hybrid drive system. The hybrid drive system H according to the present embodiment has a drive transmission system whose specific configuration differs from that of the first embodiment described above, and the configuration of the control system of this hybrid drive system also differs in part accordingly. In addition, the specific content of the initial explosion torque correction control partially differs from that of the first embodiment. The following description will focus on points where the hybrid drive system H according to the present embodiment differs from that of the first embodiment. Note that aspects not described in particular detail are similar to those of the first embodiment.

The hybrid drive system H according to the present embodiment includes the input shaft I that is drive-coupled to the internal combustion engine E; the output shaft O that is drive-coupled to the wheels W; a rotating electric machine MG; and the speed change device TM. Each of these configurations is accommodated inside the drive system case (not shown) that is fixed to the vehicle body.

The input shaft I is drive-coupled to the internal combustion engine E. In the present embodiment, the input shaft I is drive-coupled to the shift input shaft M through an input clutch CT. Here, the input clutch CT is provided between the internal combustion engine E and the rotating electric machine MG, and can switch between transmitting and not transmitting drive power between the internal combustion engine E and the rotating electric machine MG. The input clutch CT selectively drive-couples the input shaft I and the shift input shaft M to each other. A wet multi-disc clutch, a dry single-disc clutch, or the like, for example, is well suited for use as this type of input clutch CT. The input clutch CT in the present embodiment corresponds to a "friction engagement device" of the present invention. Moreover, the input shaft I corresponds to the "drive input member" and the shift input shaft M corresponds to the "input member" of the present invention.

The rotating electric machine MG includes a stator St that is fixed to the drive system case; and a rotor Ro that is rotatably supported on the radial inner side of the stator St. The rotor Ro of the rotating electric machine MG is drive-coupled to the shift input shaft M so as to rotate together with the shift input shaft M. The rotating electric machine MG can function as a motor (electric motor) that receives a supply of electric power to generate motive power, and also function as a generator (electric generator) that receives a supply of motive power to generate electric power. The rotating electric machine MG when functioning as a generator generates electricity using the torque of the internal combustion engine E and the inertia of the vehicle, and supplies electric power to charge the battery 11. The rotating electric machine when functioning as a motor receives a supply of electric power accumulated in the battery 11 and performs power running. An operation control for the rotating electric machine MG is performed through a rotating electric machine control unit (not shown) and an inverter (not shown) in accordance with a control command from the main control unit 30.

After the internal combustion engine start-up request is made, the internal combustion engine start-up control section 32 included in the main control unit 30 according to the present embodiment starts up the internal combustion engine E by controlling the operation of the input clutch CT through the hydraulic control device 26, and controlling the rotational speed and the torque of the rotating electric machine MG through the rotating electric machine control unit. More specifically, the internal combustion engine start-up control section 32 engages the input clutch CT that is disengaged in the electric running mode, and increases the rotational speed and the torque of the rotating electric machine MG, which increases the rotational speed of the internal combustion engine E through the engaged input clutch CT. When the ignition-start rotational speed Nf is reached soon after increasing the rotational speed of the internal combustion engine E, the internal combustion engine start-up control section 32 starts up the internal combustion engine E by starting fuel injection to the combustion chamber of the internal combustion engine E and igniting the injected fuel inside the combustion chamber.

The first torque correction section 33 is a functional portion that corrects the output torque of the rotating electric machine MG so as to cancel out the torque fluctuations of the shift input shaft M that accompany the initial explosion of the internal combustion engine E. The first torque correction section 33 corrects the output torque of the rotating electric machine MG so as to cancel out the torque fluctuations of the shift input shaft M, which are caused by the initial explosion torque generated from the initial explosion of the internal combustion engine E. The method by which the first torque correction section 33 sets the torque correction amount Tα is identical to the method used in the first embodiment described above, and will not be explained in detail here.

The second torque correction section 34 is a functional portion that, when the initial explosion of the internal combustion engine E occurs during a shift operation of the speed change device TM, modifies the torque correction amount Tα set by the first torque correction section 33 in a direction that suppresses changes in the rotational speed of the shift input shaft M that advance the shift operation. Using the torque correction amount Tα set by the first torque correction section 33 as a reference, the second torque correction section 34 modifies the torque correction amount in a direction that produces changes in the rotational speed of the shift input shaft M that slow the shift operation.

Figure 8:
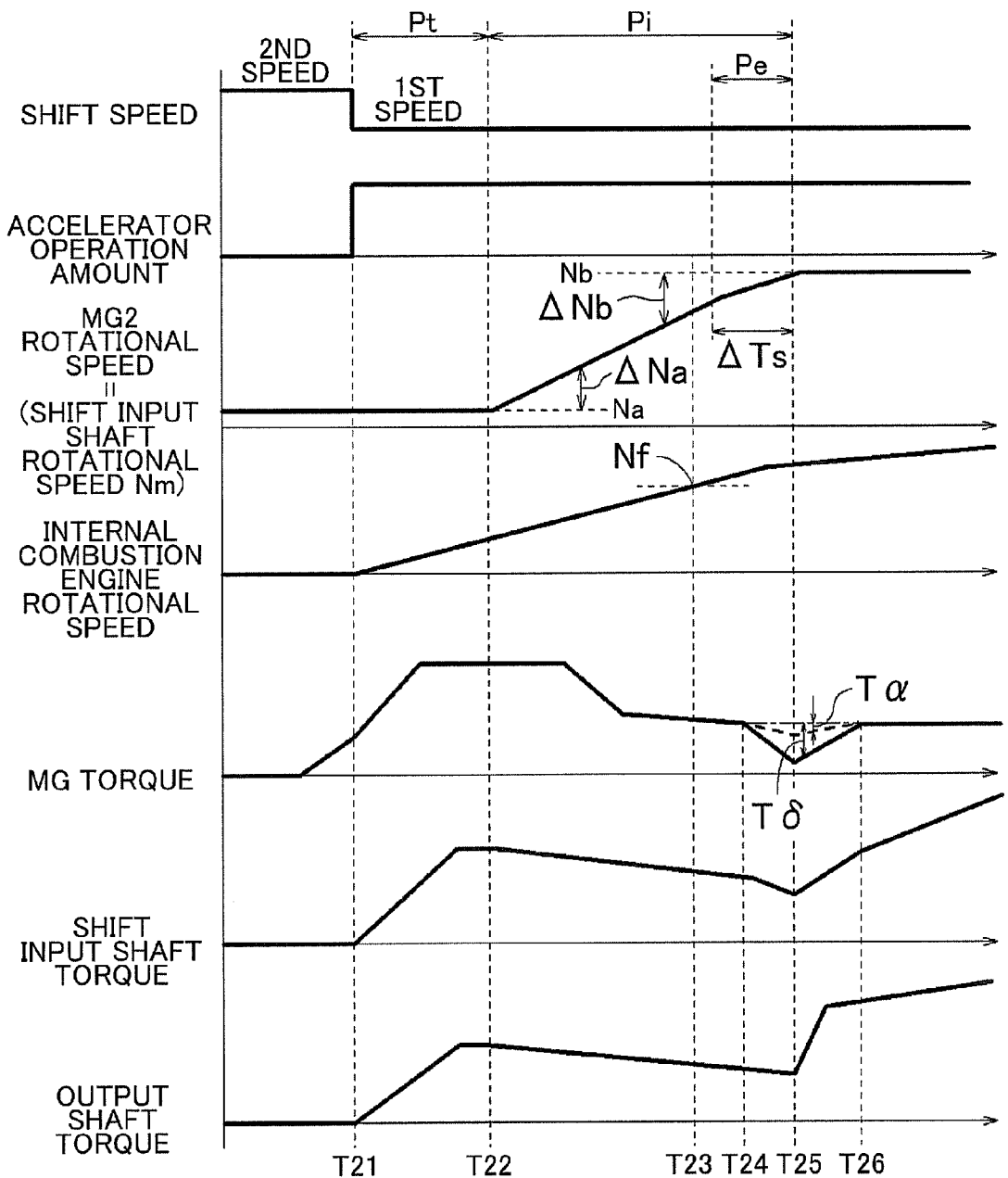
FIG. 8 is a timing chart that shows an example of the operation states of various parts based on the initial explosion torque correction control according to the second embodiment.
Figure 9:
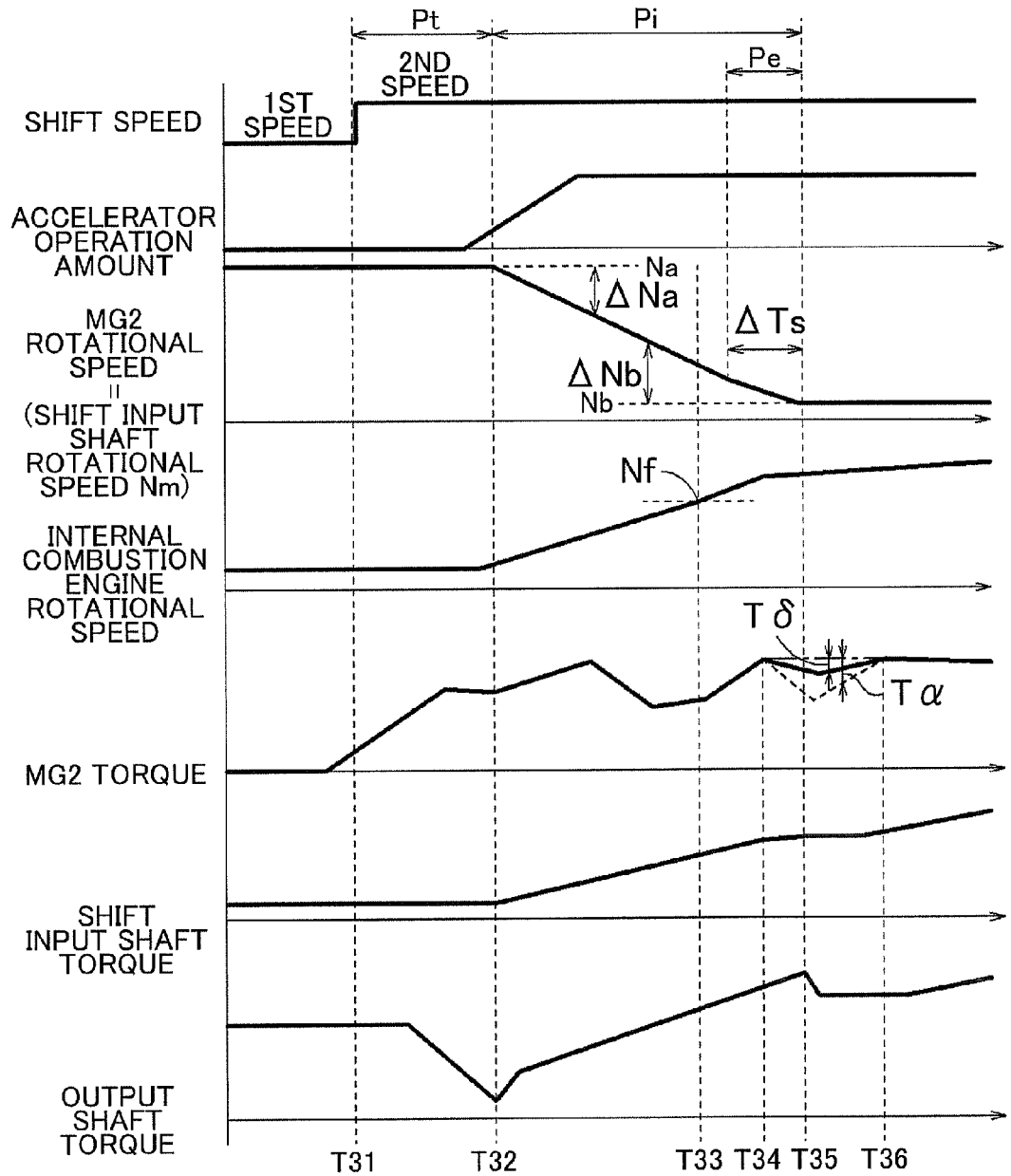
FIG. 9 is a timing chart that shows another example of the operation states of various parts based on the initial explosion torque correction control according to the second embodiment.

In the present embodiment, the second torque correction section 34 determines whether the shift end period Pe is underway based on a predetermined projected remaining shift time ΔT. Here, the projected remaining shift time ΔT is calculated based on the second differential rotational speed ΔNb acquired by the differential rotational speed acquisition section 35, and an actual rotational acceleration (rotational speed change rate) Am of the shift input shaft M acquired by a rotational acceleration acquisition section 36. Specifically, the projected remaining shift time ΔT at each point is calculated as a quotient found by dividing the second differential rotational speed ΔNb at a particular point by the rotational acceleration Am at that particular point. In the present embodiment, the second torque correction section 34 determines that the shift end period Pe is underway if the projected remaining shift time ΔT at that point is equal to or less than a predetermined synchronization determination remaining shift time ΔTs set in advance (see FIG. 8 and so forth). As the synchronization determination remaining shift time ΔTs, a value such as 100 to 300 (ms) may be set. A value such as 150 to 200 (ms) is preferred. The synchronization determination remaining shift time ΔTs in the present embodiment corresponds to the "synchronization determination threshold" of the present invention.

In the present embodiment, the second torque correction section 34 changes the basic torque correction amount Tα if a point after the elapse of the predetermined time that uses the point at which the ignition-start rotational speed Nf is reached as a reference falls inside the shift end period Pe within the inertia phase Pi, that is, if the second differential rotational speed ΔNb is greater than zero and the projected remaining shift time ΔT is equal to or less than the synchronization determination remaining shift time ΔTs. Depending on the direction in which the shift speed of the speed change device TM is switched, the second torque correction section 34 modifies the basic torque correction amount Tα in a direction that suppresses changes in the rotational speed of the shift input shaft M that advance the shift operation, which is similar to the first embodiment described above. That is, in the case of downshifting by the shift control, the second torque correction section 34 modifies the basic torque correction amount Tα so as to change the output torque of the rotating electric machine MG toward the negative direction with respect to the output torque of the rotating electric machine MG after correction by the first torque correction section 33. Meanwhile, in the case of upshifting by the shift control, the second torque correction section 34 modifies the basic torque correction amount Tα so as to change the output torque of the rotating electric machine MG toward the positive direction with respect to the output torque of the rotating electric machine MG after correction by the first torque correction section 33.

Thus, similar to the hybrid drive system H according to the first embodiment, the hybrid drive system H according to the present embodiment that can execute the initial explosion torque control described above is also capable of suppressing the occurrence of shock and achieving a satisfactory response before completion of both the internal combustion engine start-up control and the shift control if an internal combustion engine start-up request and a shift request are almost simultaneously made.

According to the present embodiment, the hybrid drive system H includes and stores in the memory 38 a map of a revised torque correction amount Tδ that is selectively used only when there is overlap between the generation of the initial explosion torque and the shift operation of the speed change device TM. This map is separate from the map of the basic torque correction amount Tα normally used. The revised torque correction amount Tδ is set as a torque correction amount that, with respect to the basic torque correction amount Tα set by the first torque correction section 33, is pre-modified in a direction that suppresses changes in the rotational speed of the shift input shaft M that advance the shift operation. The revised torque correction amount Tδ corresponds to the modified torque correction amount Tγ of the first embodiment, which is acquired by adding the special torque correction amount Tβ to the basic torque correction amount Tα (Tγ=Tα+Tβ). Similar to the basic torque correction amount Tα, the revised torque correction amount Tδ described above is specified as a value that, from the start point of the initial explosion torque correction, increases at a predetermined rate for a predetermined time and then decreases at a predetermined rate soon after to zero. The revised torque correction amount Tδ is also acquired as an empirical value that is calculated by way of experiment in advance and set uniform as a general rule, similar to the basic torque correction amount Tδ and the special torque correction amount Tβ. Thus, by adopting a configuration that includes the revised torque correction amount Tδ as a map, the hybrid drive system H according to the present embodiment has an advantage of shorter computation processing for the initial explosion torque correction control.

3. Other Embodiments

Other embodiments of the hybrid drive system according to the present invention will be described now. Note that the characteristic configurations disclosed in the respective embodiments below are not limited to those particular embodiments, and may also be applied in combination with the characteristic configurations disclosed in other embodiments unless an inconsistency occurs.

(1) In the first embodiment described above, as an example, the second torque correction section 34 adds the special torque correction amount Tβ to the basic torque correction amount Tα, thus modifying the basic torque correction amount Tα. In the second embodiment described above, as an example, the second torque correction section 34 sets the pre-modified, revised torque correction amount Tδ with respect to the basic torque correction amount Tα, based on the map of the revised torque correction amount Tδ. However, the embodiments of the present invention are not limited to these examples. That is, the second torque correction section 34 may modify the torque correction amount in any manner, provided that the torque correction amount is modified in a direction that suppresses changes in the rotational speed of the shift input shaft M that advance the shift operation. For example, in another preferred embodiment of the present invention, the second torque correction section 34 may modify the basic torque correction amount Tα by multiplying the basic torque correction amount Tα by a predetermined coefficient.

(2) In the first embodiment described above, as an example, the basic torque correction amount Tα and the special torque correction amount Tβ are specified as values that, from the start point of the initial explosion torque correction, increase at a predetermined rate for a predetermined time and then decrease at a predetermined rate soon after to zero. However, the embodiments of the present invention are not limited to this example. That is, another preferred embodiment of the present invention has a configuration in which one or both of these torque correction amounts is/are specified as a fixed value unrelated to the passage of time.

(3) In the embodiments described above, as an example, the second torque correction section 34 is configured to function if the initial explosion of the internal combustion engine E occurs during the shift end period Pe within the inertia phase Pi. However, the embodiments of the present invention are not limited to this example. That is, another preferred embodiment of the present invention has a configuration in which the second torque correction section 34 functions if the point at which the initial explosion of the internal combustion engine E occurs is at least within the inertia phase Pi, even if not within the shift end period Pe.

(4) In the first embodiment described above, as an example, the second torque correction section 34 determines whether the shift end period Pe is underway based on the second differential rotational speed ΔNb. In the second embodiment described above, as an example, the second torque correction section 34 determines whether the shift end period Pe is underway based on the projected remaining shift time ΔT. However, the embodiments of the present invention are not limited to these examples. That is, another preferred embodiment of the present invention has a configuration in which whether the shift end period Pe is underway is based on both the second rotational speed ΔNb and the projected remaining shift time ΔT. In such case, a configuration may be adopted in which the determination conditions are set as the second differential rotational speed ΔNb being equal to or less than the synchronization determination differential rotational speed ΔNs, and the projected remaining shift time ΔT being equal to or less than the synchronization determination remaining shift time ΔTs. If both determination conditions are met, it is determined that the shift end period Pe is underway. Alternatively, a configuration may be adopted in which it is determined that the shift end period Pe is underway if either of these two conditions is met.

(5) In the embodiments described above, as an example, the second torque correction section 34 determines that the initial explosion of the internal combustion engine E has occurred at a point after the elapse of a predetermined time once the rotational speed of the internal combustion engine E increases and reaches the ignition-start rotational speed Nf. However, the embodiments of the present invention are not limited to this example. That is, another preferred embodiment of the present invention has a configuration in which the point at which the initial explosion of the internal combustion engine E occurs is determined, for example, based on the point at which the fuel in the internal combustion engine E ignites or the point at which the rotational speed of the internal combustion engine E reaches the ignition-start rotational speed Nf.

(6) In the embodiments described above, as an example, the second torque correction section 34 modifies the basic torque correction amount Tα in both cases of downshifting and upshifting by the shift control. However, the embodiments of the present invention are not limited to this example. That is, another preferred embodiment of the present invention has a configuration in which, in only the case of downshifting by the shift control, for example, the second torque correction section 34 modifies the basic torque correction amount Tα so as to change the output torque of the second rotating electric machine MG2 toward the negative direction with respect to the output torque of the second rotating electric machine MG2 (rotating electric machine MG) after correction by the first torque correction section 33. Alternatively, another preferred embodiment of the present invention has a configuration in which, in only the case of upshifting by the shift control, the second torque correction section 34 modifies the basic torque correction amount Tα so as to change the output torque of the second rotating electric machine MG2 toward the positive direction with respect to the output torque of the second rotating electric machine MG2 (rotating electric machine MG) after correction by the first torque correction section 33.

(7) In the embodiments described above, the synchronization determination differential rotational speed ΔNs, the synchronization determination remaining shift time ΔTs, and other various determination reference values are exemplified as specific numerical values. However, the embodiments of the present invention are not limited to these examples. That is, these specific numerical values are merely examples, and may be appropriately modified in accordance with characteristics of the hybrid drive system H and the vehicle in which the hybrid drive system H is mounted.

(8) In the second embodiment described above, as an example, the hybrid drive system H is a one-motor parallel type in which the input shaft I and the shift input shaft M are selectively drive-coupled through the input clutch CT. However, the embodiments of the present invention are not limited to this example. That is, another preferred embodiment of the present invention has a configuration in which there is no input clutch CT, and the input shaft I and the shift input shaft M are drive-coupled in an integrated manner.

(9) In the embodiments described above, as an example, the operations of various parts of the hybrid drive system H are controlled by the main control unit 30, the internal combustion engine control unit 21, the first rotating electric machine control unit 22, and the second rotating electric machine control unit 23 working in cooperation. However, the embodiments of the present invention are not limited to this example. That is, for example, another preferred embodiment of the present invention has a configuration that includes a single control unit that performs controls for various parts including the internal combustion engine E, the rotating electric machine MG (first rotating electric machine MG1, second rotating electric machine MG2), and the speed change device TM, and the operations of the various parts of the hybrid drive system H are controlled by the single control unit. In this case, the single control unit constitutes the "control device" of the present invention.

(10) The configurations of the drive transmission system of the hybrid drive system H and the contents of the initial explosion torque correction control described in the above embodiments may be combined in any manner as long as no inconsistencies occur. That is, the hybrid drive system according to the present invention may be constituted by appropriately combining the configuration of the drive transmission system of the hybrid drive system H and the content of the initial explosion torque correction control described in the first embodiment with the configuration of the drive transmission system of the hybrid drive system H and the content of the initial explosion torque correction control described in the second embodiment. For example, in the two-motor split type of hybrid drive system H of the first embodiment, a configuration may be adopted in which the initial explosion torque correction control is executed based on the map of the revised torque correction amount Tδ as in the second embodiment. Alternatively, in the one-motor parallel type of hybrid drive system H of the second embodiment, a configuration may be adopted in which the initial explosion torque correction control is executed based on the special torque correction amount Tβ and a predetermined equation as in the first embodiment. The same applies to combinations of the configuration of the drive transmission system of the hybrid drive system H and the method for determining the shift end period Pe of the initial explosion torque correction control.

(11) The embodiments disclosed in the present specification are merely illustrative examples in all respects regarding other configurations as well, and the embodiments of the present invention are not limited to those described herein. That is, constitutions that partially modify as appropriate configurations not described in the claims are naturally included in the technical scope of the present invention, provided the constitutions include a configuration described in the claims of the present application or an equivalent configuration.

The present invention is well suited for use as a hybrid drive system that includes a rotating electric machine; an input member that is drive-coupled to an internal combustion engine and the rotating electric machine; an output member that is drive-coupled to a wheel; a speed change device that has a plurality of switchable shift speeds, and changes the rotational speed of the input member at a speed ratio of the respective shift speeds and transmits the changed rotational speed to the output member; and a control device that at least performs an operation control for the rotating electric machine.

The invention claimed is:

1. A hybrid drive system comprising:
   a rotating electric machine;
   an input member that is drive-coupled to an internal combustion engine and the rotating electric machine;
   an output member that is drive-coupled to a wheel;
   a speed change device that has a plurality of switchable shift speeds, and changes the rotational speed of the input member at a speed ratio of the respective shift speeds and transmits the changed rotational speed to the output member; and
   a control device that at least performs an operation control for the rotating electric machine, wherein
   the control device includes
   a first torque correction section that corrects the output torque of the rotating electric machine so as to cancel out a torque fluctuation of the input member that accompanies an initial explosion of the internal combustion engine; and
   a second torque correction section that, when the initial explosion of the internal combustion engine occurs during a shift operation of the speed change device, modifies the torque correction amount set by the first torque correction section in a direction that suppresses a change in the rotational speed of the input member that advances the shift operation.

2. The hybrid drive system according to claim 1, wherein the second torque correction section modifies the torque correction amount in a direction that corresponds to a switching direction of the shift speed of the speed change device.

3. The hybrid drive system according to claim 2, wherein the second torque correction section
   if the shift speed of the speed change device is switched to a shift speed with a larger speed ratio, modifies the torque correction amount so as to change the output torque of the rotating electric machine toward a negative direction with respect to the output torque corrected by the first torque correction section, and
   if the shift speed of the speed change device is switched to a shift speed with a smaller speed ratio, modifies the torque correction amount so as to change the output torque of the rotating electric machine toward a positive direction with respect to the output torque corrected by the first torque correction section.

4. The hybrid drive system according to claim 3, wherein the second torque correction section modifies the torque correction amount if the initial explosion of the internal combustion engine occurs within a shift end period during which a predicted remaining shift time is equal to or less than a predetermined synchronization determination threshold, the predicted remaining shift time being calculated based on a differential rotational speed between an actual rotational speed of the input member and a post-shift estimated rotational speed of the input member that is calculated based on the rotational speed of the output member, and based on a change rate of the actual rotational speed of the input member.

5. The hybrid drive system according to claim 4, wherein the second torque correction section modifies the torque correction amount if the initial explosion of the internal combustion engine occurs within the shift end period during which the differential rotational speed between the actual rotational speed of the input member and the post-shift estimated rotational speed of the input member that is calculated based on the rotational speed of the output member is equal to or less than the predetermined synchronization determination threshold.

6. The hybrid drive system according to claim 5, further comprising:
   a first rotating electric machine;
   a second rotating electric machine as the rotating electric machine;
   a drive input member that is drive-coupled to the internal combustion engine; and
   a differential gear device, wherein
   the differential gear device includes, in order of rotational speed, a first rotation element, a second rotation element, and a third rotation element, and
   the first rotation element of the differential gear device is drive-coupled to the first rotating electric machine, the second rotation element is drive-coupled to the drive input member, and the third rotation element is drive-coupled to the input member and the second rotating electric machine.

7. The hybrid drive system according to claim 1, further comprising:
   a drive input member that is drive-coupled to the internal combustion engine, wherein
   the drive input member and the input member are one of integratedly drive-coupled and selectively drive-coupled through a friction engagement device.

8. The hybrid drive system according to claim 1, wherein the second torque correction section modifies the torque correction amount if the initial explosion of the internal combustion engine occurs within a shift end period during which a predicted remaining shift time is equal to or less than a predetermined synchronization determination threshold, the predicted remaining shift time being calculated based on a differential rotational speed between an actual rotational speed of the input member and a post-shift estimated rotational speed of the input member that is calculated based on the rotational speed of the output member, and based on a change rate of the actual rotational speed of the input member.

9. The hybrid drive system according to claim 1, wherein the second torque correction section modifies the torque correction amount if the initial explosion of the internal combustion engine occurs within the shift end period during which the differential rotational speed between the actual rotational speed of the input member and the post-shift estimated rotational speed of the input member that is calculated based on the rotational speed of the output member is equal to or less than the predetermined synchronization determination threshold.

10. The hybrid drive system according to claim 8, further comprising:
a first rotating electric machine;
a second rotating electric machine as the rotating electric machine;
a drive input member that is drive-coupled to the internal combustion engine; and
a differential gear device, wherein
the differential gear device includes, in order of rotational speed, a first rotation element, a second rotation element, and a third rotation element, and
the first rotation element of the differential gear device is drive-coupled to the first rotating electric machine, the second rotation element is drive-coupled to the drive input member, and the third rotation element is drive-coupled to the input member and the second rotating electric machine.

11. The hybrid drive system according to claim 8, wherein the second torque correction section modifies the torque correction amount if the initial explosion of the internal combustion engine occurs within the shift end period during which the differential rotational speed between the actual rotational speed of the input member and the post-shift estimated rotational speed of the input member that is calculated based on the rotational speed of the output member is equal to or less than the predetermined synchronization determination threshold.

12. The hybrid drive system according to claim 11, further comprising:
a first rotating electric machine;
a second rotating electric machine as the rotating electric machine;
a drive input member that is drive-coupled to the internal combustion engine; and
a differential gear device, wherein
the differential gear device includes, in order of rotational speed, a first rotation element, a second rotation element, and a third rotation element, and
the first rotation element of the differential gear device is drive-coupled to the first rotating electric machine, the second rotation element is drive-coupled to the drive input member, and the third rotation element is drive-coupled to the input member and the second rotating electric machine.

13. The hybrid drive system according to claim 11, further comprising:
a drive input member that is drive-coupled to the internal combustion engine, wherein
the drive input member and the input member are one of integratedly drive-coupled and selectively drive-coupled through a friction engagement device.

14. The hybrid drive system according to claim 8, further comprising:
a first rotating electric machine;
a second rotating electric machine as the rotating electric machine;
a drive input member that is drive-coupled to the internal combustion engine; and
a differential gear device, wherein
the differential gear device includes, in order of rotational speed, a first rotation element, a second rotation element, and a third rotation element, and
the first rotation element of the differential gear device is drive-coupled to the first rotating electric machine, the second rotation element is drive-coupled to the drive input member, and the third rotation element is drive-coupled to the input member and the second rotating electric machine.

15. The hybrid drive system according to claim 8, further comprising:
a drive input member that is drive-coupled to the internal combustion engine, wherein
the drive input member and the input member are one of integratedly drive-coupled and selectively drive-coupled through a friction engagement device.

16. The hybrid drive system according to claim 9, further comprising:
a first rotating electric machine;
a second rotating electric machine as the rotating electric machine;
a drive input member that is drive-coupled to the internal combustion engine; and
a differential gear device, wherein
the differential gear device includes, in order of rotational speed, a first rotation element, a second rotation element, and a third rotation element, and
the first rotation element of the differential gear device is drive-coupled to the first rotating electric machine, the second rotation element is drive-coupled to the drive input member, and the third rotation element is drive-coupled to the input member and the second rotating electric machine.

17. The hybrid drive system according to claim 9, further comprising:
a drive input member that is drive-coupled to the internal combustion engine, wherein
the drive input member and the input member are one of integratedly drive-coupled and selectively drive-coupled through a friction engagement device.

18. The hybrid drive system according to claim 2, wherein the second torque correction section modifies the torque correction amount if the initial explosion of the internal combustion engine occurs within a shift end period during which a predicted remaining shift time is equal to or less than a predetermined synchronization determination threshold, the predicted remaining shift time being calculated based on a differential rotational speed between an actual rotational speed of the input member and a post-shift estimated rotational speed of the input member that is calculated based on the rotational speed of the output member, and based on a change rate of the actual rotational speed of the input member.

19. The hybrid drive system according to claim 2, wherein the second torque correction section modifies the torque correction amount if the initial explosion of the internal combustion engine occurs within the shift end period during which the differential rotational speed between the actual rotational speed of the input member and the post-shift estimated rotational speed of the input member that is calculated based on the rotational speed of the output member is equal to or less than the predetermined synchronization determination threshold.

20. The hybrid drive system according to claim 9, further comprising:
   a first rotating electric machine;
   a second rotating electric machine as the rotating electric machine;
   a drive input member that is drive-coupled to the internal combustion engine; and
   a differential gear device, wherein
   the differential gear device includes, in order of rotational speed, a first rotation element, a second rotation element, and a third rotation element, and
   the first rotation element of the differential gear device is drive-coupled to the first rotating electric machine, the second rotation element is drive-coupled to the drive input member, and the third rotation element is drive-coupled to the input member and the second rotating electric machine.

* * * * *